(12) United States Patent
Ogishima et al.

(10) Patent No.: US 7,355,664 B2
(45) Date of Patent: Apr. 8, 2008

(54) MULTI-DOMAIN LIQUID CRYSTAL DISPLAY DEVICE

(75) Inventors: Kiyoshi Ogishima, Soraku-gun (JP); Masumi Kubo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 51 days.

(21) Appl. No.: 10/648,340

(22) Filed: Aug. 27, 2003

(65) Prior Publication Data
US 2004/0041963 A1 Mar. 4, 2004

(30) Foreign Application Priority Data
Aug. 30, 2002 (JP) .............................. 2002-254114

(51) Int. Cl.
G02F 1/1337 (2006.01)
G02F 1/1333 (2006.01)
(52) U.S. Cl. ..................... 349/129; 349/110
(58) Field of Classification Search ............... 349/129, 349/110, 111
See application file for complete search history.

(56) References Cited

U.S. PATENT DOCUMENTS

| | | | | |
|---|---|---|---|---|
| 5,309,264 | A | * | 5/1994 | Lien et al. .................. 349/143 |
| 5,648,828 | A | * | 7/1997 | Sakamoto et al. .......... 349/110 |
| 5,652,634 | A | * | 7/1997 | Hirata et al. ................ 349/129 |
| 5,666,179 | A | | 9/1997 | Koma |
| 5,781,262 | A | * | 7/1998 | Suzuki et al. ............... 349/128 |
| 5,995,176 | A | | 11/1999 | Sibahara ...................... 349/44 |
| 6,384,889 | B1 | | 5/2002 | Miyachi et al. |
| 6,400,440 | B1 | * | 6/2002 | Colgan et al. .............. 349/160 |
| 6,446,293 | B2 | * | 9/2002 | Lindquist et al. ........... 15/1.52 |
| 6,476,896 | B1 | * | 11/2002 | Liu ............................. 349/129 |
| 6,567,139 | B2 | * | 5/2003 | Huang ........................ 349/110 |
| 6,567,144 | B1 | * | 5/2003 | Kim et al. .................. 349/128 |
| 6,583,836 | B2 | | 6/2003 | Kim et al. .................. 349/129 |
| 6,710,837 | B1 | * | 3/2004 | Song et al. ................. 349/143 |

(Continued)

FOREIGN PATENT DOCUMENTS

EP 0 884 626 A2 12/1998

(Continued)

OTHER PUBLICATIONS

Korean Office Action mailed Sep. 27, 2005 (w/English translation thereof).

*Primary Examiner*—Andrew Schechter
*Assistant Examiner*—W. Patty Chen
(74) *Attorney, Agent, or Firm*—Nixon & Vanderhye P.C.

(57) ABSTRACT

The liquid crystal display device of this invention includes a first substrate, a second substrate, and a vertical alignment type liquid crystal layer including liquid crystal molecules having negative dielectric anisotropy disposed between the two substrates. In each of a plurality of picture-element regions, the liquid crystal layer has a plurality of liquid crystal regions different in the direction in which liquid crystal molecules tilt upon application of a voltage. At least one of the first and second substrates has a light-shield layer overlapping at least part of boundary region defined as regions separating the plurality of liquid crystal regions from each other. The part of the boundary region overlapping the light-shield layer is a region permitting liquid crystal molecules surrounding the region to tilt so that the ends of the liquid crystal molecules closer to the substrate having the light-shield layer go away from the region upon application of a voltage.

17 Claims, 13 Drawing Sheets

U.S. PATENT DOCUMENTS

| | | | |
|---|---|---|---|
| 6,741,314 B2* | 5/2004 | Song | 349/144 |
| 6,788,375 B2 | 9/2004 | Ogishima et al. | 349/130 |
| 6,950,160 B2 | 9/2005 | Kubo et al. | 349/129 |
| 6,950,161 B2 | 9/2005 | Ogishima et al. | 349/130 |
| 7,084,943 B2 | 8/2006 | Kubo et al. | 349/114 |
| 2001/0019388 A1* | 9/2001 | Kim et al. | 349/129 |
| 2002/0036740 A1 | 3/2002 | Kubo et al. | |
| 2002/0063834 A1* | 5/2002 | Sawasaki et al. | 349/130 |
| 2002/0075436 A1* | 6/2002 | Kubo et al. | 349/129 |
| 2003/0107695 A1 | 6/2003 | Kubo et al. | |

FOREIGN PATENT DOCUMENTS

| | | |
|---|---|---|
| EP | 1 006 394 | 6/2000 |
| EP | 1 103 840 A2 | 5/2001 |
| EP | 1 111 441 A2 | 6/2001 |
| EP | 1 113 311 A2 | 7/2001 |
| EP | 1 113 312 A2 | 7/2001 |
| JP | 08-313896 | 11/1996 |

* cited by examiner

MULTI-DOMAIN LIQUID CRYSTAL DISPLAY DEVICE

BACKGROUND OF THE INVENTION

The present invention relates to a liquid crystal display device, and more particularly, to a liquid crystal display device having a wide viewing angle characteristic and providing high quality display.

The liquid crystal display device is a flat display device having excellent features of being thin, light in weight and low in power consumption. However, the liquid crystal display device has a shortcoming of being large in "viewing angle dependence" in which the display state changes with the direction in which the display device is observed. A main cause for the large viewing angle dependence of the liquid crystal display device is that liquid crystal molecules having uniaxial optical anisotropy are oriented uniformly in the display plane.

To improve the viewing angle characteristic of the liquid crystal display device, an orientation division method is effective, in which a plurality of regions different in orientation states are formed in each picture-element region. Various techniques have been proposed to implement this method. Among these, a technique disclosed in Japanese Laid-Open Patent Publication No. 6-301036 and No. 2000-47217 and a technique called MVA disclosed in Japanese Laid-Open Patent Publication No. 11-242225 are considered as typical techniques for implementing the orientation division on vertical alignment mode liquid crystal display devices.

In the technique disclosed in Japanese Laid-Open Patent Publication No. 6-301036 and No. 2000-47217, an inclined electric field is generated by forming slits (openings). for an electrode, to control the orientation direction of liquid crystal molecules with the generated inclined electric field.

In the MVA technique disclosed in Japanese Laid-Open Patent Publication No. 11-242225, a pair of substrates (for example, a TFT substrate and a color filter substrate) opposed to each other via a liquid crystal layer have protrusions, depressions or slits (openings of an electrode) formed on their surfaces facing the liquid crystal layer, to thereby realize the orientation division.

As the type of the orientation division of each picture-element region, there are comparatively simple types, such as two-division type in which liquid crystal molecules in each picture-element region are oriented in two directions and four-division type in which they are oriented in four directions, and comparatively complicate types, such as infinite-division type in which liquid crystal molecules are oriented in all directions and the type in which liquid crystal molecules are twisted in a liquid crystal layer.

From the standpoint of achieving equal display characteristics in all directions, liquid crystal molecules are preferably oriented in as many directions as possible in each picture-element region. In general, orientation in four or more directions is considered providing sufficient display quality.

However, as a result of examinations by the present inventors, it was found that the techniques disclosed in Japanese Laid-Open Patent Publication No. 6-301036, No. 2000-47217 and No. 11-258606 had the following problem. Although the azimuthal angle dependence of the display characteristics can be improved by these techniques, the display characteristics obtained when the display device is observed from the front is greatly different from that obtained when it is observed obliquely. Therefore, the gray-scale characteristic greatly varies with the angle at which the observer views the display plane, and this makes the observer feel unnatural.

SUMMARY OF THE INVENTION

The present invention was devised to overcome the aforementioned disadvantages, and an object of the present invention is providing a liquid crystal display device with high display quality that has a wide viewing angle characteristic and can provide display free from unnaturalness.

The liquid crystal display device of the present invention includes a first substrate, a second substrate, and a vertical alignment type liquid crystal layer including liquid crystal molecules having negative dielectric anisotropy disposed between the first substrate and the second substrate, the device having a plurality of picture-element regions each defined by a first electrode placed in the first substrate on the side facing the liquid crystal layer and a second electrode placed in the second substrate to oppose to the first electrode via the liquid crystal layer, in each of the plurality of picture-element regions, the liquid crystal layer having a plurality of liquid crystal regions different in the direction in which liquid crystal molecules tilt when a voltage is applied between the first electrode and the second electrode, wherein at least one of the first substrate and the second substrate has a light-shield layer overlapping (lying above or below) at least part of boundary region defined as regions separating the plurality of liquid crystal regions from each other, and the at least part of boundary region overlapping (lying above or below) the light-shield layer is a region permitting liquid crystal molecules surrounding the region to tilt so that ends of the liquid crystal molecules closer to the substrate having the light-shield layer go away from the region when a voltage is applied between the first electrode and the second electrode.

Preferably, the light-shield layer is placed with a predetermined spacing from the liquid crystal layer.

Alternatively, the liquid crystal display device of the present invention includes a first substrate, a second substrate, and a vertical alignment type liquid crystal layer including liquid crystal molecules having negative dielectric anisotropy disposed between the first substrate and the second substrate, the device having a plurality of picture-element regions each defined by a first electrode placed in the first substrate on the side facing the liquid crystal layer and a second electrode placed in the second substrate to oppose to the first electrode via the liquid crystal layer, in each of the plurality of picture-element regions, the liquid crystal layer having a plurality of liquid crystal regions different in the direction in which liquid crystal molecules tilt when a voltage is applied between the first electrode and the second electrode, the plurality of liquid crystal regions of the liquid crystal layer including a first liquid crystal region of which the retardation value for light incident on the liquid crystal layer obliquely from the normal to the liquid crystal layer increases with rise of an applied voltage and a second liquid crystal region of which the retardation value first decreases and then increases, wherein the device includes a light-shield layer selectively shading the first liquid crystal region when the device is observed in a direction oblique from the normal to the display plane.

The liquid crystal display device described above may further include a pair of polarizing plates placed opposing to each other via the liquid crystal layer so that their polarization axes are substantially perpendicular to each other, wherein in each of the plurality of picture-element regions, at least one of the first substrate and the second substrate may have an additional light-shield layer overlapping (lying above or below) at least part of regions in which liquid crystal molecules tilt in directions substantially parallel to the polarization axes of the pair of polarizing plates when a voltage is applied between the first electrode and the second electrode.

Alternatively, the liquid crystal display device of the present invention includes a first substrate, a second substrate, a vertical alignment type liquid crystal layer including liquid crystal molecules having negative dielectric anisotropy disposed between the first substrate and the second substrate, and a pair of polarizing plates placed opposing to each other via the liquid crystal layer so that their polarization axes are substantially perpendicular to each other, the device having a plurality of picture-element regions each defined by a first electrode placed in the first substrate on the side facing the liquid crystal layer and a second electrode placed in the second substrate to oppose to the first electrode via the liquid crystal layer, in each of the plurality of picture-element regions, the liquid crystal layer having a plurality of liquid crystal regions different in the direction in which the liquid crystal molecules tilt when a voltage is applied between the first electrode and the second electrode, wherein in each of the plurality of picture-element regions, at least one of the first substrate and the second substrate has a light-shield layer overlapping (lying above or below) at least part of regions in which liquid crystal molecules tilt in directions substantially parallel to the polarization axes of the pair of polarizing plates when a voltage is applied between the first electrode and the second electrode.

Preferably, the light-shield layer is placed substantially right on the liquid crystal layer.

At least one of the first substrate and the second substrate may have at least one protrusion having a slant side formed on the surface facing the liquid crystal layer, and the direction in which liquid crystal molecules tilt in each of the plurality of liquid crystal regions may be defined by orientation-regulating force of the at least one protrusion.

Otherwise, at least one of the first electrode and the second electrode may have at least one opening, and the direction in which liquid crystal molecules tilt in each of the plurality of liquid crystal regions may be defined by an inclined electric field generated at an edge portion of the at least one opening when a voltage is applied between the first electrode and the second electrode.

Otherwise, at least one of the first substrate and the second substrate may have at least one protrusion having a slant side formed on the surface facing the liquid crystal layer, at least one of the first electrode and the second electrode may have at least one opening, and the direction in which liquid crystal molecules tilt in each of the plurality of liquid crystal regions may be defined by orientation-regulating force of the at least one protrusion and an inclined electric field generated at an edge portion of the at least one opening when a voltage is applied between the first electrode and the second electrode.

In a preferred embodiment, the first substrate further includes switching elements respectively placed to correspond to the plurality of picture-element regions, and the first electrode includes a plurality of picture-element electrodes respectively placed for the plurality of picture-element regions and switched with the switching elements, and the second electrode includes at least one counter electrode opposed to the plurality of picture-element electrodes.

BRIEF DESCRIPTION OF THE DRAWINGS

FIG. 1A is a top view and FIG. 1B is a cross-sectional view taken along line 1B-1B' in FIG. 1A.

FIG. 2A is a top view and FIG. 2B is a cross-sectional view taken along line 2B-2B' in FIG. 2A.

FIG. 7A is a top view and FIG. 7B is a cross-sectional view taken along line 7B-7B' in FIG. 7A.

FIG. 8A is a top view and FIG. 8B is a cross-sectional view taken along line 8B-8B' in FIG. 8A.

FIG. 9A is a top view and FIG. 9B is a cross-sectional view taken along line 9B-9B' in FIG. 9A.

FIG. 10A is a top view and FIG. 10B is a cross-sectional view taken along line 10B-10B' in FIG. 10A.

FIG. 11A is a top view and FIG. 11B is a cross-sectional view taken along line 11B-11B' in FIG. 11A.

FIG. 12A is a top view and FIG. 12B is a cross-sectional view taken along line 12B-12B' in FIG. 12A.

DETAILED DESCRIPTION OF THE INVENTION

Hereinafter, preferred embodiments of the present invention will be described with reference to the accompanying drawings. Since excellent display characteristics can be obtained according to the present invention, the present invention is suitably applied to active matrix liquid crystal display devices. Herein, as embodiments of the present invention, active matrix liquid crystal display devices having thin film transistors (TFTs) as the switching elements for switching picture-element electrodes will be described. The present invention can also be applied to MIM type active matrix liquid crystal display devices and simple active matrix liquid crystal display devices.

As used herein, a region of a liquid crystal display device corresponding to one "picture element" as the minimum unit of display is called a "picture-element region". In a color liquid crystal display device, R, G and B "picture elements" constitute one "pixel". In an active matrix liquid crystal display device, a picture-element electrode and a portion of a counter electrode opposed to the picture-element electrode define a picture-element region. In a simple matrix liquid crystal display device, each of the crossings of stripe-shaped column electrodes and stripe-shaped row electrodes running perpendicular to each other defines a picture-element region. If a black matrix is placed, the picture-element region is strictly defined as a portion of a region across which a voltage is applied according to the state to be displayed that corresponds to each opening of the black matrix.

Embodiment 1

Figure 1A:
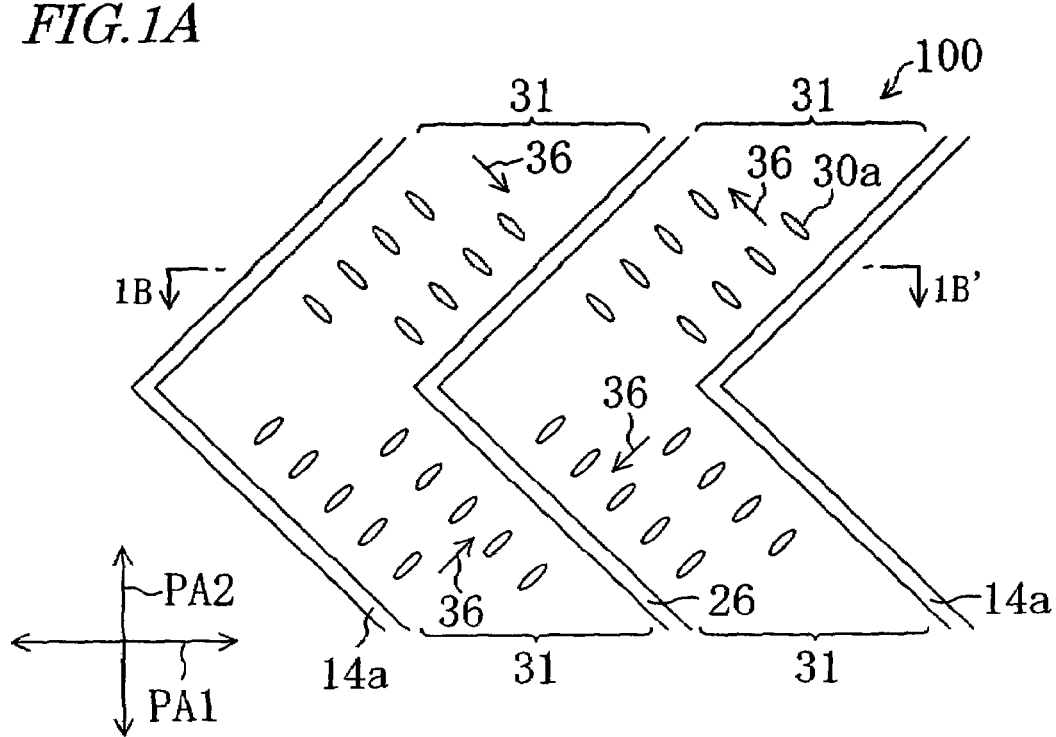
FIGS. 1A and 1B diagrammatically show a liquid crystal display device 100 of Embodiment 1 of the present invention, where
Figure 1B:
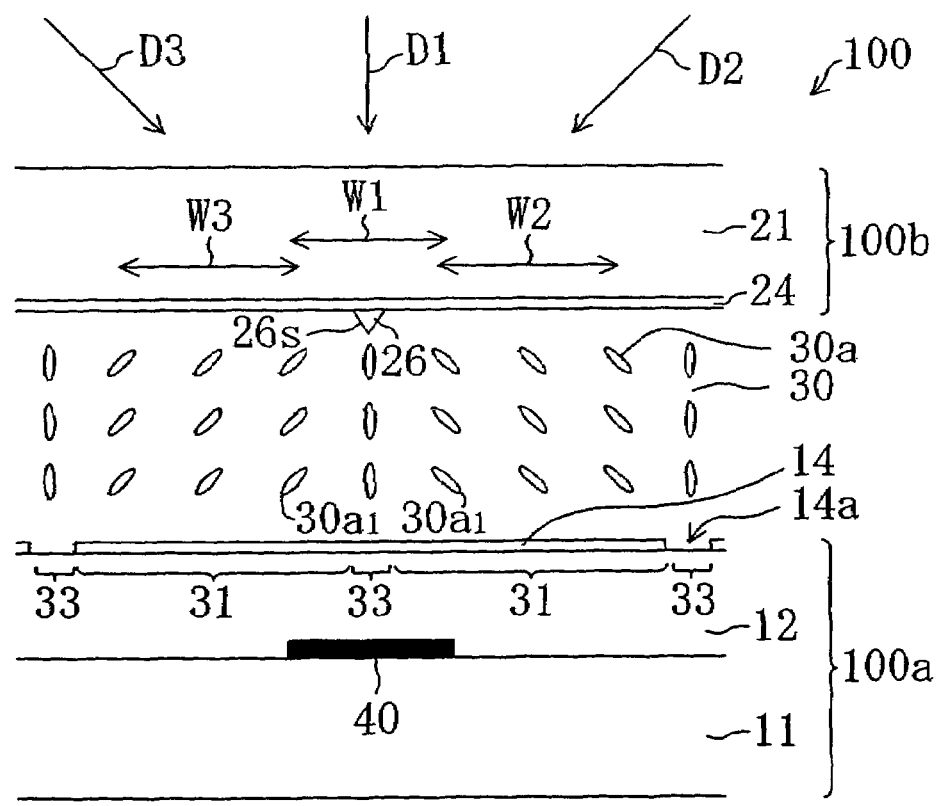

The structure of a liquid crystal display device 100 of Embodiment 1 of the present invention will be described with reference to FIGS. 1A and 1B. Note that in the following description, color filters and a black matrix are ignored for simplification. Throughout the drawings, components having the same functions are denoted by the same reference numerals and are not described repeatedly. FIG. 1A is a top view of the liquid crystal display device 100 as viewed in the direction normal to the substrate plane, and FIG. 1B is a cross-sectional view taken along line 1B-1B' in FIG. 1A. FIGS. 1A and 1B show the state under application of a voltage across the liquid crystal layer.

The liquid crystal display device 100 includes an active matrix substrate (hereinafter, called a "TFT substrate") 100a, a counter substrate (also called a "color filter substrate") 100b, and a vertical alignment type liquid crystal layer 30 disposed between the TFT substrate 100a and the counter substrate 100b.

Liquid crystal molecules 30a in the liquid crystal layer 30, which have negative dielectric anisotropy, are aligned vertically to the surfaces of vertical alignment films (not shown) formed on the surfaces of the TFT substrate 100a and the counter substrate 100b facing the liquid crystal layer 30 when no voltage is applied across the liquid crystal layer 30. That is, the liquid crystal layer 30 is in a vertically aligned state during non-voltage application. Note however that the liquid crystal molecules 30a in the liquid crystal layer 30 in the vertically aligned state may somewhat be tilted from the normal to the surfaces of the vertical alignment films (surfaces of the substrates) depending on the kind of the vertical alignment films and the kind of the liquid crystal material. In general, when the axes (also called the "axial directions") of liquid crystal molecules are at about 85° or more with respect to the surfaces of the vertical alignment films, this state is called the vertically aligned state.

The TFT substrate 100a of the liquid crystal display device 100 includes a transparent plate (glass plate, for example) 11 and picture-element electrodes 14 formed on the surface of the transparent plate 11. The counter substrate 100b includes a transparent plate (glass plate, for example) 21 and a counter electrode 24 formed on the surface of the transparent plate 21. The orientation state of the liquid crystal layer 30 in each picture-element region changes with the voltage applied between the corresponding picture-element electrode 14 and the counter electrode 24 opposed to each other via the liquid crystal layer 30. As the orientation state of the liquid crystal layer 30 changes, the polarized state and amount of light passing through the liquid crystal layer 30 change, and using this phenomenon, display is achieved. In this embodiment, a pair of polarizing plates (not shown) are opposed to each other via the TFT substrate 100a and the counter substrate 100b so that their polarization axes (transmission axes) PA1 and PA2 are orthogonal to each other.

In the liquid crystal display device 100, each picture-element region is divided in terms of the orientation to improve the viewing angle characteristic, in which the liquid crystal layer 30 includes a plurality of liquid crystal regions 31 different in the direction in which the liquid crystal molecules 30a tilt (the orientation of the major axes of the tilting liquid crystal molecules 30a orthogonally projected on the substrate surface: azimuthal direction). Arrows 36 in FIG. 1A indicate the directions in which the liquid crystal molecules 30a in the liquid crystal regions 31 tilt, and in this case, indicate the directions in which the ends of the liquid crystal molecules 30a closer to the counter substrate 100b fall upon application of a voltage.

The direction in which the liquid crystal molecules 30a tilt is defined by an orientation-regulating structure placed on the side of the TFT substrate 100a and an orientation-regulating structure placed on the side of the counter substrate 100b. Hereinafter, this will be described in detail.

The picture-element electrode 14 of the TFT substrate 100a has a plurality of openings 14a. In this embodiment, the openings 14a, having a shape of a slit (a shape having a width (side orthogonal to the length) extremely small with respect to the length), extend in parallel with each other. Each opening 14a has a side extending at an angle of 45° with respect to the longitudinal and lateral sides of the picture-element electrode 14. The direction in which the side of the opening 14a extends changes by 90° every predetermined pitch, forming a zigzag (or dogleg) shape. In this embodiment, the openings 14a of the picture-element electrode 14 are formed to have a width of 10 μm and a pitch of 60 μm.

When a voltage is applied between the picture-element electrode 14 and the counter electrode 24, an inclined electric field represented by an inclined equipotential line is formed in a region of the liquid crystal layer 30 located above an edge portion of each opening 14a of the picture-element electrode 14 (a portion around the inside of each opening 14a including the boundary (fringe) of the opening 14a). Therefore, when a voltage is applied, the liquid crystal molecules 30a having negative dielectric anisotropy, which are in the vertically aligned state during non-voltage application, tilt along the inclination of the inclined electric field generated in the edge portion of the opening 14a.

The counter substrate 100b has protrusions 26 on the surface thereof facing the liquid crystal layer 30. Each protrusion 26 has slant sides 26s and extends in a zigzag (or dogleg) shape as viewed in the direction normal to the substrate surface, as in the case of the openings 14a. The direction in which the slant sides 26s extend corresponds with the direction in which the sides of the openings 14a extend, and the protrusion 26 is placed roughly in the middle between the two adjacent openings 14. In this embodiment, the protrusions 16 are formed to have a width of 10 μm and a pitch of 60 μm.

The surface of the protrusion 26 has a vertical alignment property (typically, a vertical alignment film (not shown) is formed to cover the protrusion 26). Therefore, liquid crystal molecules 30a on the slant sides 26s are aligned substantially vertically to the slant sides 26s due to the anchoring effect of the slant sides 26s.

When a voltage is applied across the liquid crystal layer 30 in the state described above, other liquid crystal molecules 30a in the vicinity of the protrusion 26 tilt to conform to the inclined orientation on the slant sides 26s of the protrusion 26 caused due to the anchoring effect of the slant sides 26s.

As described above, the direction of the tilt of the liquid crystal molecules 30a located above the edge portion of the opening 14a of the picture-element electrode 14 upon application of a voltage is defined by the orientation-regulating structure of the TFT substrate 100a, that is, the picture-element electrode 14 having the opening 14a. Also, the direction of the tilt of the liquid crystal molecules 30a located in the vicinity of the protrusion 26 upon application of a voltage is defined by the orientation-regulating structure of the counter substrate 100b, that is, the protrusion 26 having the slant sides 26s. Therefore, upon application of a voltage, the remaining liquid crystal molecules 30a tilt to conform to the tilt of these liquid crystal molecules 30a located in the portions described above. As a result, the direction of the tilt of the liquid crystal molecules 30a in each liquid crystal region 31 is defined by the inclined electric field generated in the edge portion of the opening 14a of the picture-element electrode 14 and the orientation-regulating force of the protrusion 26 on the counter substrate 100b.

As shown in FIG. 1A, the picture-element region of the liquid crystal display device 100 includes a plurality of liquid crystal regions 31 different in the direction of the tilt of the liquid crystal molecules 30a. In the illustrated example, the picture-element region is divided to provide four directions apart by angles of integral multiples of 90° from one another, and these four directions are at an angle of about 45° with respect to the polarization axes PA1 and PA2 of polarizing plates.

In the liquid crystal display device 100 according to the present invention, the TFT substrate 100a further includes light-shield layers 40. As shown in FIG. 1B, each light-shield layer 40 is formed to overlap (lie below) at least part of boundary region 33 defined as region separating the plurality of liquid crystal regions 31 from one another.

More specifically, in this embodiment, the light-shield layer 40 has the same width of 10 μm as the protrusion 26, so as to be the same in shape as viewed in the direction normal to the substrate as the protrusion 26 and extend below the protrusion 26. Note that in FIG. 1B, the width of the light-shield layer 40 is exaggerated for the purpose of easy understanding of description to follow. In the illustrated example, a transparent insulating layer 12 is formed covering the light-shield layer 40 formed on the transparent plate 11, so that a predetermined spacing is provided between the light-shield layer 40 and the liquid crystal layer 30.

As shown in FIG. 1B, the boundary region 33 overlapping (lying above) the light-shield layer 40 corresponds to a region permitting liquid crystal molecules 30a surrounding the region to tilt so that ends 30a1 of the liquid crystal molecules 30a closer to the TFT substrate 100a, that is, the substrate having the light-shield layer 40 go away from this region when a voltage is applied between the picture-element electrode 14 and the counter electrode 24.

The liquid crystal display device 100, having the light-shield layers 40 placed as described above, is small in the difference of the display characteristics between observation from the front and observation in an oblique direction, and thus can provide display free from unnaturalness. This will be described in detail as follows.

First, referring to FIGS. 2A and 2B, why a conventional liquid crystal display device 1000 having no light-shield layer makes the viewer feel unnatural will be described.

Figure 2A:
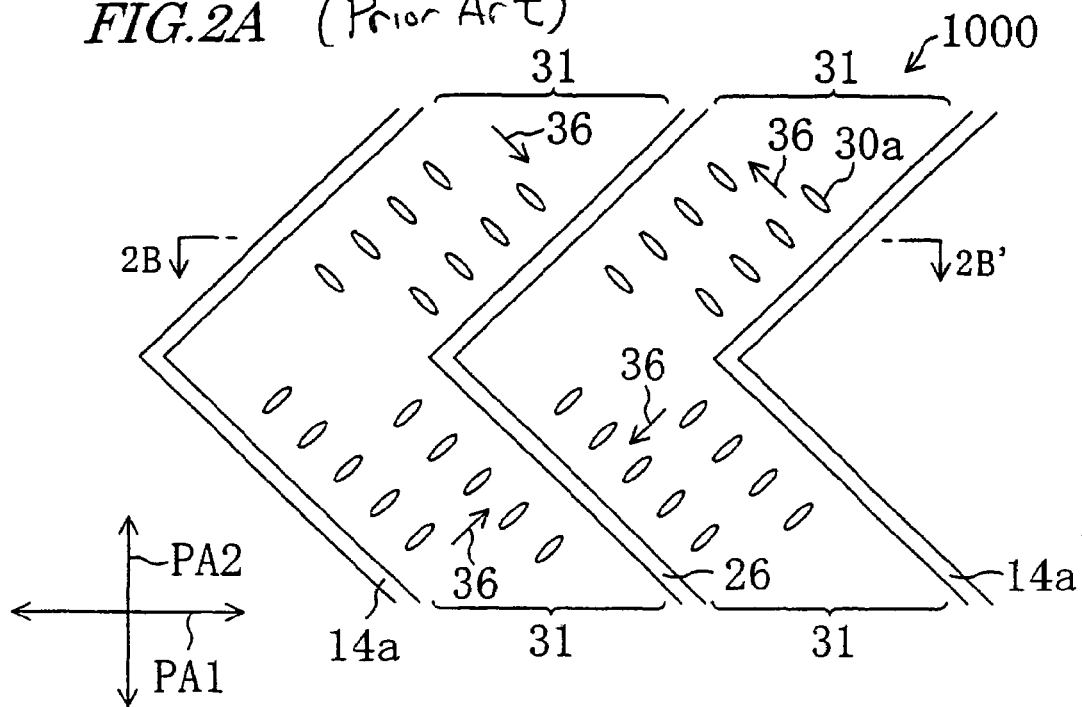
FIGS. 2A and 2B diagrammatically show a conventional liquid crystal display device 1000 having no light-shield layer, where
Figure 2B:
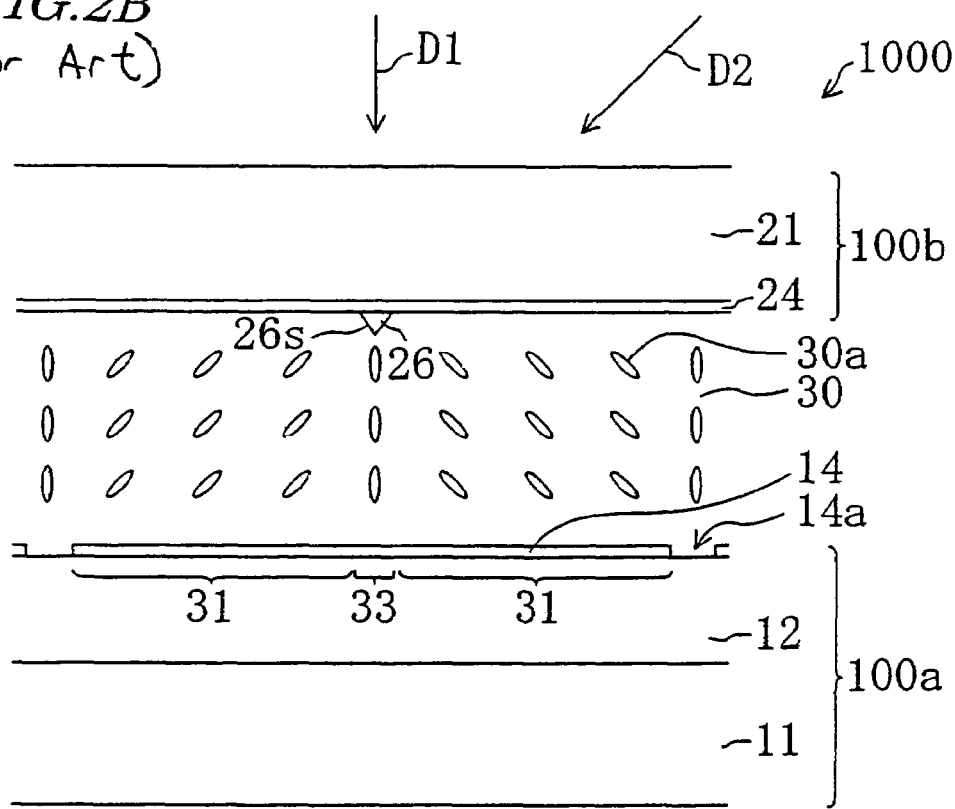

The conventional liquid crystal display device 1000 of FIGS. 2A and 2B has substantially the same structure as the liquid crystal display device 100 except that the former has no light-shield layer overlapping at least part of the boundary region 33.

In the liquid crystal display device 1000, the azimuthal angle dependence of the display characteristics is improved because each picture-element region is divided into a plurality of liquid crystal regions 31. However, a great difference arises in display characteristics between observation from the front and observation in an oblique direction.

Figure 3:
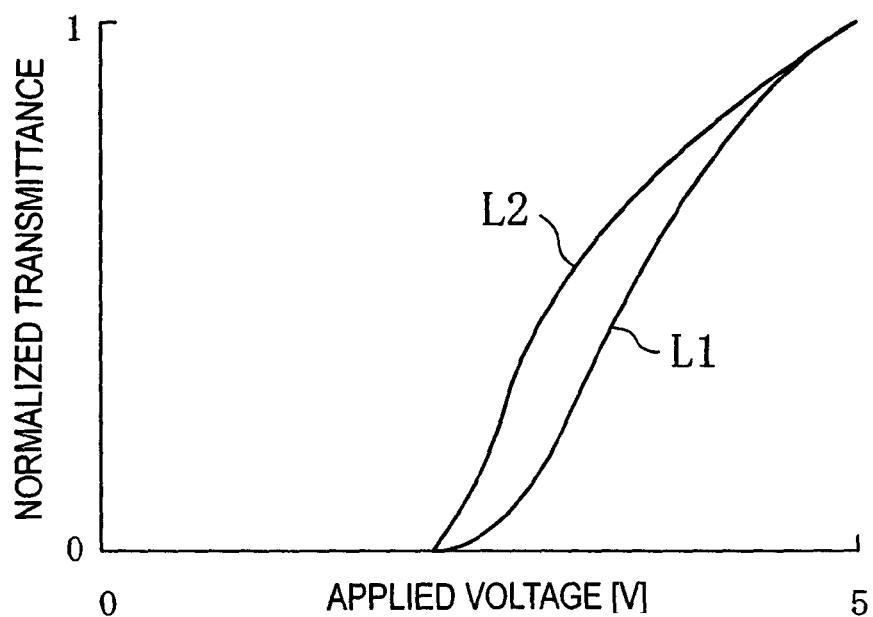
FIG. 3 is a graph showing the voltage-transmittance characteristics obtained when the liquid crystal display device 1000 is observed in a normal direction D1 and in an oblique direction D2.

FIG. 3 is a graph showing the normalized voltage-transmittance characteristic obtained when the liquid crystal display device 1000 is observed in the normal direction (direction indicated by arrow D1 in FIG. 2B) and the normalized voltage-transmittance characteristic obtained when it is observed in an oblique direction (direction indicated by arrow D2 in FIG. 2B) at a visual angle tilted along the polarization axis PA1. In FIG. 3, the axis of abscissas represents the applied voltage (V) across the liquid crystal layer 30 and the axis of ordinates represents the normalized transmittance.

As shown in FIG. 3, a voltage-transmittance curve L2 obtained during observation in an oblique direction is sharper than a voltage-transmittance curve L1 obtained during observation in the normal direction. In the state of application of a gray-scale voltage, the transmittance obtained during observation in an oblique direction (normalized transmittance) is higher than the transmittance obtained during observation in the normal direction.

The increase of the transmittance in an oblique direction during application of a gray-scale voltage is caused by the behavior of liquid crystal molecules 30a in a specific liquid crystal region 31 among the plurality of liquid crystal regions 31 of each picture-element region. Specifically, it is caused by the behavior of the liquid crystal molecules 30a tilting in the direction opposite to the observer who observes obliquely (that is, tilting so that the ends of the liquid crystal molecules 30a closer to the counter substrate 100b go away from the observer).

The above discussion will be made in more detail focusing on the two liquid crystal regions 31 shown in FIG. 2B. The liquid crystal molecules 30a in both liquid crystal regions 31 tilt at an angle of 45° with respect to the polarization axes PA1 and PA2 as shown in FIG. 2A. However, when the two liquid crystal regions 31 are observed in an oblique direction (direction indicated by arrow D2 in FIG. 2B) at a visual angle tilted along the polarization axis PA1, for example, the liquid crystal molecules 30a in the liquid crystal region 31 on the left as viewed from FIG. 2B tilt to fall toward the observer, while those in the liquid crystal region 31 on the right tilt to fall toward the opposite to the observer.

Figure 4:
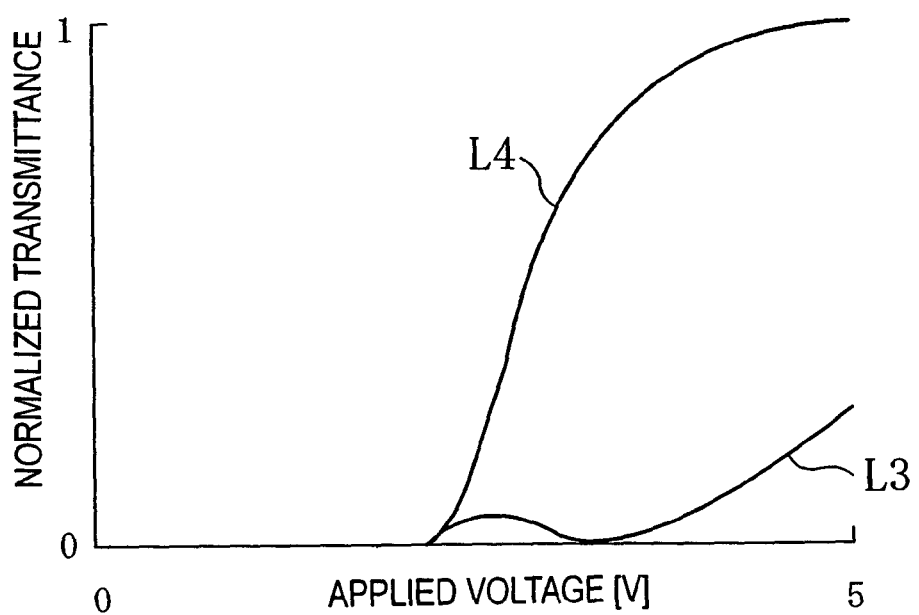
FIG. 4 is a graph showing the voltage-transmittance characteristics obtained when a liquid crystal region 31 in which liquid crystal molecules 30a tilt to fall toward the observer is observed in an oblique direction and when a liquid crystal region 31 in which liquid crystal molecules 30a tilt to fall toward the opposite to the observer is observed in an oblique direction.

FIG. 4 is a graph showing the voltage-transmittance characteristic obtained when the two liquid crystal regions 31 shown in FIG. 2B are observed in an oblique direction, in which a voltage-transmittance curve L3 is for the liquid crystal region 31 in which the liquid crystal molecules 30a tilt to fall toward the observer (liquid crystal region on the left in FIG. 2B), and a voltage-transmittance curve L4 is for the liquid crystal region 31 in which the liquid crystal molecules 30a tilt to fall toward the opposite to the observer (liquid crystal region on the right in FIG. 2B).

As shown in FIG. 4, in the liquid crystal region 31 in which the liquid crystal molecules 30a fall toward the observer, the transmittance first drops and then rises with rise of the voltage. In the liquid crystal region 31 in which the liquid crystal molecules 30a fall toward the opposite to, the observer, the transmittance rises roughly monotonously with rise of the voltage. The reason is that, while the retardation value of the liquid crystal layer 30 for light incident obliquely to the liquid crystal layer 30 (in a direction oblique from the normal to the liquid crystal layer 30) first decreases and then increases with rise of the voltage in the liquid crystal region 31 in which the liquid crystal molecules 30a fall toward the observer, it increases monotonously with rise of the voltage in the liquid crystal region 31 in which the liquid crystal molecules 30a fall toward the opposite to the observer.

The voltage-transmittance characteristic obtained during observation in an oblique direction shown in FIG. 3 represents the sum of the voltage-transmittance characteristics of the respective liquid crystal regions 31 as those shown in FIG. 4. It is therefore considered that the increase of the transmittance in an oblique direction during application of a gray-scale voltage is caused by the liquid crystal molecules 30a falling toward the opposite to the observer.

In the liquid crystal display device 100 according to the present invention, the light-shield layer 40 is formed to overlap (lie below) at least part of the boundary region 33 defined as region separating the plurality of liquid crystal regions 31 from one another. The at least part of the boundary region 33 that is overlapping (lying above) the light-shield layer 40 is a region permitting the liquid crystal molecules 30a surrounding the region to tilt so that the ends of the liquid crystal molecules 30a closer to the TFT substrate 100a, that is, the substrate having the light-shield layer 40 go away from this region when a voltage is applied.

The thus-provided light-shield layer 40 selectively shades the liquid crystal region 31 in which the liquid crystal molecules 30a tilt toward the opposite to the observer, that is, the liquid crystal region 31 of which the retardation value for light incident obliquely increases roughly monotonously with rise of the voltage, among the two light crystal regions 31 adjacent to each other via the boundary region 33.

In FIG. 1B, W1 denotes the width of a region shaded by the light-shield layer 40 during observation in the normal direction D1, and W2 denotes the width of a region shaded by the light-shield layer 40 during observation in the oblique direction D2. As shown in FIG. 1B, during observation in the normal direction, the light-shield layer 40 shades the region of the liquid crystal layer 30 right above the light-shield layer 40, and thus will not change the proportion of contribution to the front-view display between the two liquid crystal regions 31. However, during observation in an oblique direction, in which parallax occurs, the light-shield layer 40 selectively shades the liquid crystal region 31 in which the liquid crystal molecules 30a fall toward the opposite to the observer. FIG. 1B also shows the width W3 of a region shaded by the light-shield layer 40 during observation in an oblique direction D3 opposite to the oblique direction D2. As is found from FIG. 1B, during observation in the oblique direction D3, also, the light-shield layer 40 selectively shades the liquid crystal region 31 in which the liquid crystal molecules 30a fall toward the opposite to the observer.

Therefore, the liquid crystal region 31 in which the liquid crystal molecules 30a fall toward the opposite to the observer partly fails to contribute to the display observed in an oblique direction. This suppresses the increase of the transmittance in the oblique direction during application of a gray-scale voltage, and thus brings the voltage-transmittance characteristic during observation in the oblique direction close to the voltage-transmittance characteristic during observation in the normal direction. As a result, the oblique-direction display characteristics and the normal-direction display characteristics can be made close to each other, and hence display free from unnaturalness can be realized.

Figure 5:
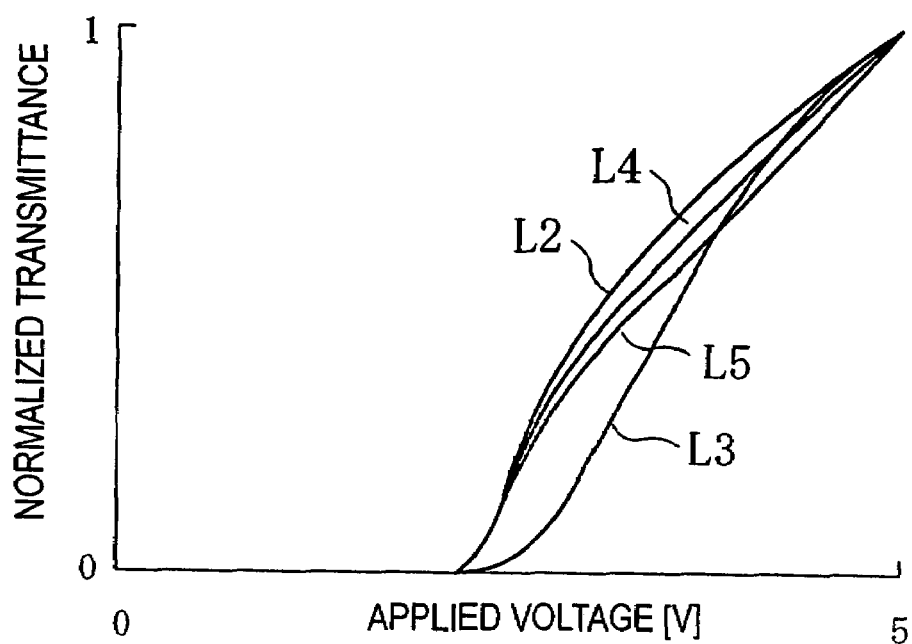
FIG. 5 is a graph showing the voltage-transmittance characteristics obtained when the liquid crystal display device 100 of Embodiment 1 is observed in the normal direction D1 and in the oblique direction D2.

FIG. 5 shows a voltage-transmittance curve L3 obtained when the liquid crystal display device 100 of this embodiment is observed in the normal direction D1 and voltage-transmittance curves L4 and L5 obtained when it is observed in the oblique direction D2. The voltage-transmittance curves L4 and L5 show the cases when the depth of the light-shield layer 40, which is defined as the spacing between the bottom surface of the light-shield layer 40 (surface further from the liquid crystal layer 30) and the liquid crystal layer 30, is 3 μm and 5 μm, respectively. The thickness of the liquid crystal layer 30 is 4 μm. FIG. 5 also shows the voltage-transmittance curve L2 obtained when the conventional liquid crystal display device 1000 is observed in the oblique direction D2 for comparison.

As shown in FIG. 5, the voltage-transmittance curves L4 and L5 of the liquid crystal display device 100 obtained during observation in an oblique direction are closer in shape to the voltage-transmittance curve L3 obtained during observation in the normal direction than the voltage-transmittance curve L2 of the display device having no light-shield layer is. Therefore, natural display in which the normal-direction display characteristics and the oblique-direction display characteristics are close to each other is obtained.

The depth, width, shape and the like of the light-shield layer 40 are not limited to those described in this embodiment, but may be appropriately set depending on the specifications of the liquid crystal display device and desired transmittance, display characteristics and the like.

The depth of the light-shield layer 40 may be set depending on the thickness of the liquid crystal layer 30, the size of the liquid crystal regions 31 and the like so that the liquid crystal region 31 can be effectively shaded. To effectively shade a specific liquid crystal region 31 by use of occurrence of parallax, the light-shield layer 40 should preferably be placed with a predetermined spacing from the liquid crystal layer 30, and the spacing between the light-shield layer 40 and the liquid crystal layer 30, that is, the depth of the light-shield layer 40 should preferably be large to some extent. The parallax is larger when the light-shield layer 40 is placed with a predetermined spacing from the liquid crystal layer 30 than when it is placed immediately under the liquid crystal layer 30. In the former case, the liquid crystal region 31 can be sufficiently shaded even if the visual angle (the tilt angle from the normal to the display plane) is comparatively small. As is found from FIG. 5, in this embodiment, the oblique-direction voltage-transmittance characteristic can be brought closer to the normal-direction voltage-transmittance characteristic when the depth of the light-shield layer 40 is 5 μm than when it is 3 μm.

A preferred depth of the light-shield layer 40 will be described with reference to FIG. 6. In this embodiment, the liquid crystal region 31 can be effectively shaded by setting the depth D of the light-shield layer 40 to satisfy the relationship, $D+T_3/2=\sqrt{3}\times P/2$ where D is the depth of the light-shield layer (=thickness $T_1$ of the light-shield layer 40+thickness $T_2$ of the transparent insulating layer 12 existing on the light-shield layer 40, in this case), $T_3$ is the thickness of the liquid crystal layer 30, and P is the pitch of arrangement of the protrusions 26 and the openings 14a. By setting the depth D of the light-shield layer 40 in this way, the center of the light-shield layer 40 will shade roughly the middle of the region between the protrusion 26 and the opening 14a adjacent to each other, that is, the center portion of the liquid crystal region 31, when the liquid crystal display device is observed at a visual angle of 60° (assuming that the average refractive index of the components of the liquid crystal display device is 1.6 and the observation is made in the air having the refractive index of 1.0).

In this embodiment, the width W of the light-shield layer 40 was made substantially equal to the width of the protrusion 26. The width of the light-shield layer 40 is not limited to this, but is preferably wider from the standpoint of further improving the display characteristics by shading a larger portion of the liquid crystal region 31 in which the liquid crystal molecules 30a fall toward the opposite to the observer. In this case, the light-shield layer 40 may overlap part of the liquid crystal region 31, not only the boundary region 33. A wider light-shield layer 40 may however decrease the transmittance during observation from the front. Therefore, from the standpoint of suppressing decrease of the transmittance in the normal direction, the narrow light-shield layer 40 is preferred. A side face of the light-shield layer 40 also functions to shade the liquid crystal region 31 due to occurrence of parallax. Therefore, the light-shield layer 40 may be made thick to increase the region of the side face and thereby enable shading of a larger portion of the liquid crystal region 31. Thus, even when the width of the light-shield layer 40 is set comparative small, the liquid crystal region 31 can be sufficiently shaded while preventing decrease of the transmittance in the normal direction by increasing the thickness of the light-shield layer 40.

The shape of the light-shield layer 40 is not limited to that described above. In the case that the light-shield layer 40 is opposed to the protrusion 26 as in this embodiment (or opposed to the opening 14a of the picture-element electrode as will be described later), loss in transmittance in the normal direction can be minimized by providing the light-shield layer 40 of the same shape as the protrusion 26 (or opening 14a). The reason is that the liquid crystal molecules 30a in the boundary region 31 facing the protrusion 26 (or opening 14a) are aligned roughly vertically even during application of a voltage, to maintain the conformity of the alignment with the surrounding liquid crystal molecules 30a. Therefore, the region of the liquid crystal layer 30 facing the protrusion 26 (or opening 14a) is inherently low in the proportion of contribution to the transmittance.

The light-shield layer 40 was placed only on the side of the TFT substrate 100a in the above description. Alternatively, a light-shield layer 40 may be placed additionally or only on the side of the counter substrate 100b.

Figure 7A:
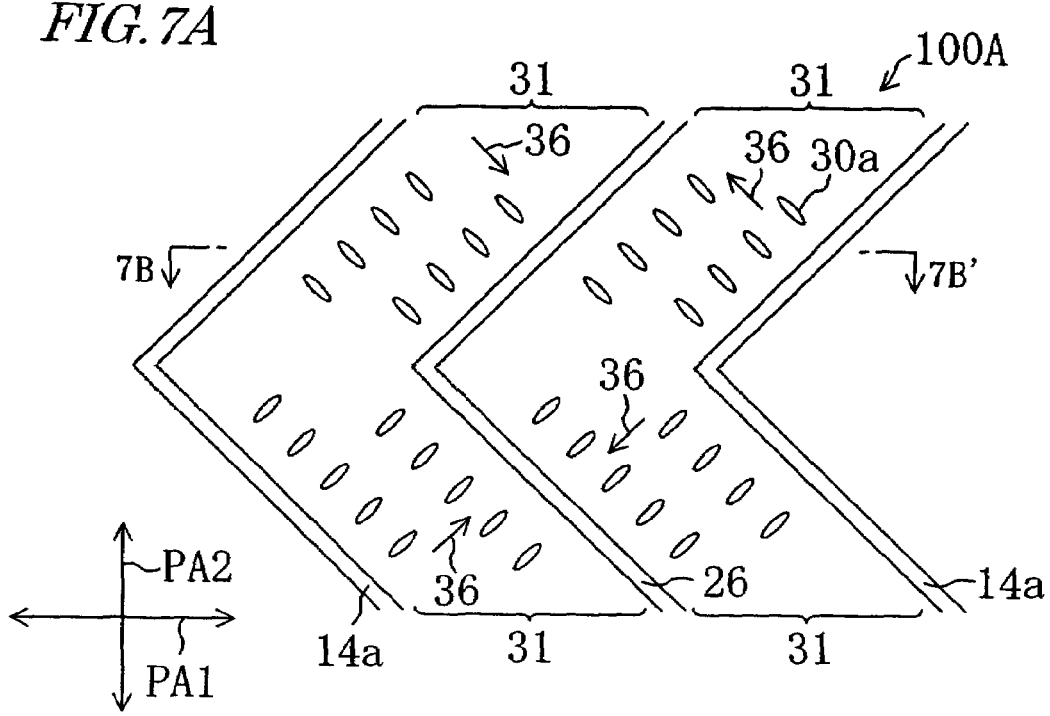
FIGS. 7A and 7B diagrammatically show another liquid crystal display device 100A of Embodiment 1 of the present invention, where
Figure 7B:
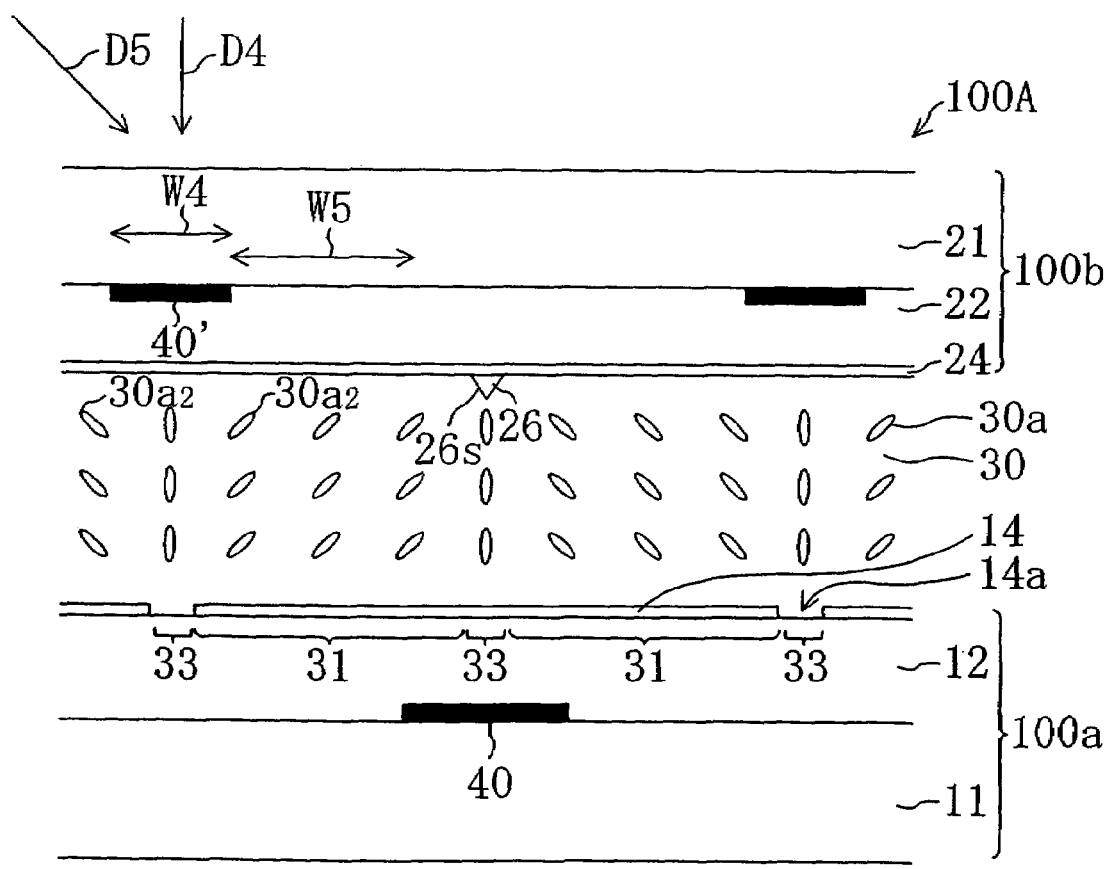

FIGS. 7A and 7B show another liquid crystal display device 100A of this embodiment, which includes light-shield layers 40' placed on the side of the counter substrate 100b in addition to the light-shield layers 40 placed on the side of the TFT substrate 100a.

Each light-shield layer 40' of the counter substrate 100b is formed to overlap (lie above) at least part of the boundary region 33. As shown in FIG. 7B, the at least part of the boundary region 33 that overlaps (lies below) the light-shield layer 40' is a region permitting liquid crystal molecules 30a surrounding the region to tilt so that ends 30a2 of the liquid crystal molecules 30a closer to the counter substrate 100b, that is, the substrate having the light-shield layer 40' go away from this region when a voltage is applied. A transparent insulating film 22 is formed covering the light-shield layers 40' formed on the transparent plate 21, and thus the light-shield layers 40' are placed with a predetermined spacing from the liquid crystal layer 30.

Each light-shield layer 40' of the counter substrate 100b selectively shades the liquid crystal region 31 in which liquid crystal molecules 30a fall toward the opposite to the observer, that is, the liquid crystal region 31 of which the retardation value for light incident obliquely increases monotonously with rise of the voltage, among the liquid crystal regions 31 adjacent to each other via the boundary region 33.

In FIG. 7B, W4 denotes the width of a region shaded by the light-shield layer 40' during observation in the normal direction D4, and W5 denotes the width of a region shaded by the light-shield layer 40' during observation in an oblique direction D5. As shown in FIG. 7B, during observation in the normal direction, the light-shield layer 40' shades the region of the liquid crystal layer 30 right under the light-shield layer 40'. However, during observation in an oblique direction, the light-shield layer 40' selectively shades the liquid crystal region 31 in which the liquid crystal molecules 30a tilt toward the opposite to the observer due to occurrence of parallax.

Thus, in the liquid crystal display device 100A, not only the light-shield layers 40 on the side of the TFT substrate 100a but also the light-shield layers 40' on the side of the counter substrate 100b selectively shade the liquid crystal regions 31 in which the liquid crystal molecules 30a tilt toward the opposite to the observer. Accordingly, the oblique-direction display characteristics can be made close to the normal-direction display characteristics, and thus display free from unnaturalness can be realized.

Figure 6:
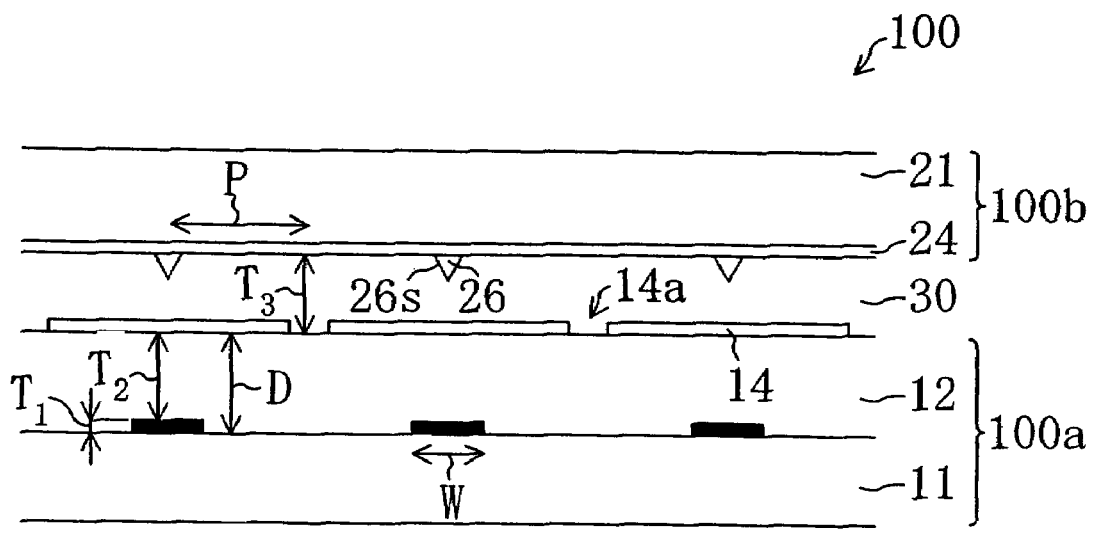
FIG. 6 is a diagrammatic cross-sectional view of the liquid crystal display device 100 of Embodiment 1.

In the liquid crystal display device 100A shown in FIGS. 7A and 7B, the width of the light-shield layers 40 and 40' is preferably equal to or larger than the width of the protrusions 26 and the openings 14a, and is preferably smaller than the pitch of arrangement of the protrusions 26 and the openings 14a (P in FIG. 6). If the width of the light-shield layers 40 and 40' is equal to or larger than the pitch of arrangement of the protrusions 26 and the openings 14a, the transmittance in the normal direction will be almost zero.

As described above, in the liquid crystal display devices 100 and 100A, the light-shield layers 40 (40') are placed on the side of the TFT substrate 100a and/or on the side of the counter substrate 100b, to enable selective shading of the liquid crystal regions 31 in which the liquid crystal molecules 30a tilt toward the opposite to the observer.

On the side of which substrate the light-shield layer should be placed for a certain boundary region 33 may be determined in the following manner. The liquid crystal molecules 30a surrounding a boundary region 33 tilt so that the ends of the liquid crystal molecules 30a closer to either one of the substrates go away from the boundary region 33. On the side of this substrate, the light-shield layer for the boundary region 33 is placed. In other words, the light-shield layer should be placed so that the liquid crystal molecules 30a surrounding the region overlapping (lying above or below) the light-shield layer tilt so that the ends thereof closer to the substrate having the light-shield layer go away from the region upon application of a voltage.

Specifically, when the surrounding liquid crystal molecules 30a tilt so that the ends thereof closer to the TFT substrate 100a go away from the boundary region (for example, when the light-shield layer is placed to correspond to the boundary region 33 facing the protrusion 26 shown in FIGS. 1B and 7B), the light-shield layer may be placed on the side of the TFT substrate 100a. Likewise, when the surrounding liquid crystal molecules 30a tilt so that the ends thereof closer to the counter substrate 100b go away from the boundary region (for example, when the light-shield layer is placed to correspond to the boundary region 33 facing the opening 14a shown in FIGS. 1B and 7B), the light-shield layer may be placed in the counter substrate 100b.

In the liquid crystal display device according to the present invention, the light-shield layer is selectively placed on the side of either one of the substrates determined by paying attention to the behavior of the liquid crystal molecules 30a surrounding each boundary region 33 during application of a voltage. Therefore, the liquid crystal regions 31 in which the liquid crystal molecules 30a tilt toward the opposite to the observer are selectively shaded in whichever oblique direction the observer views the liquid crystal display device, and thus natural display free from unnaturalness can be realized. Since the boundary regions shaded by the light-shield layers during observation in the normal direction are typically regions that hardly contribute to the display inherently (even without the light-shield layers), it is unlikely to decrease the transmittance due to the placement of the light-shield layers.

The light-shield layers are made of a light-shield material such as metal including aluminum and resin, and may be formed at an arbitrary stage in the process of fabrication of the TFT substrate 100a and the counter substrate 100b so that a predetermined spacing is provided between the light-shield layers and the liquid crystal layer 30. If the light-shield layers are formed of a film commonly used for scanning lines and signal lines formed on the transparent plate 11 of the TFT substrate 100a, no new step is required for formation of the light-shield layers. The light-shield layers may shade substantially the entire incident light incident thereon, or may be a translucent film allowing passing of part of incident light.

Figure 8A:
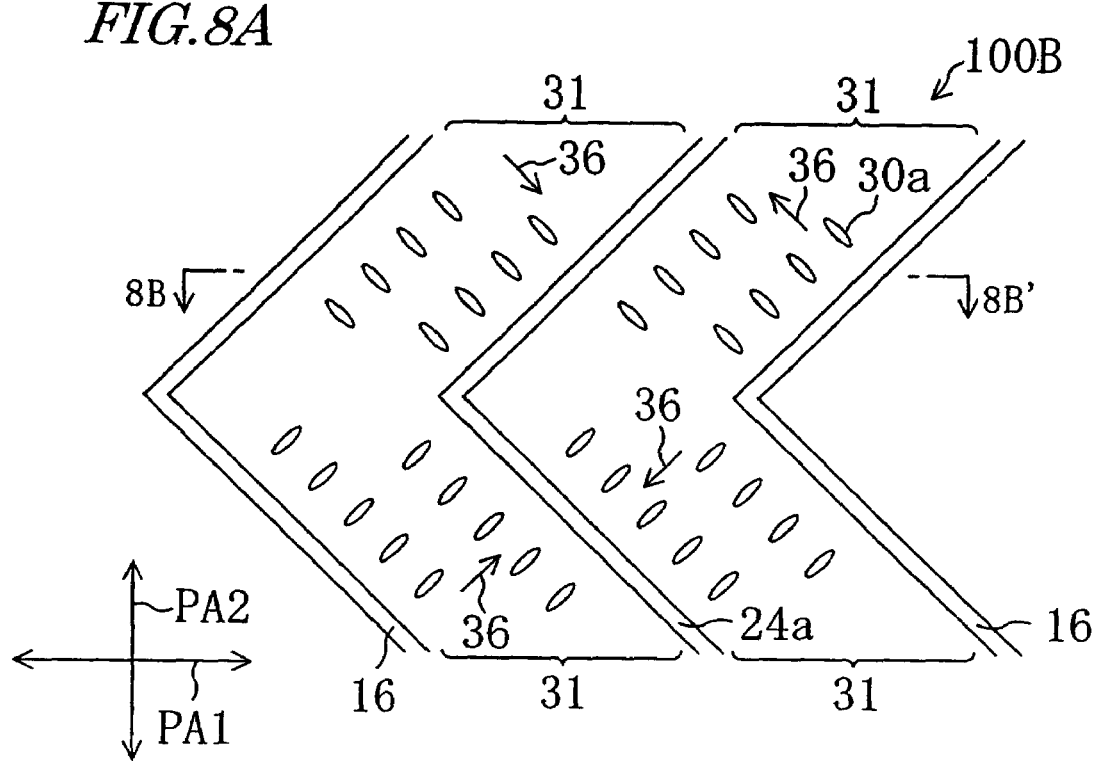
FIGS. 8A and 8B diagrammatically show yet another liquid crystal display device 100B of Embodiment 1 of the present invention, where
Figure 8B:
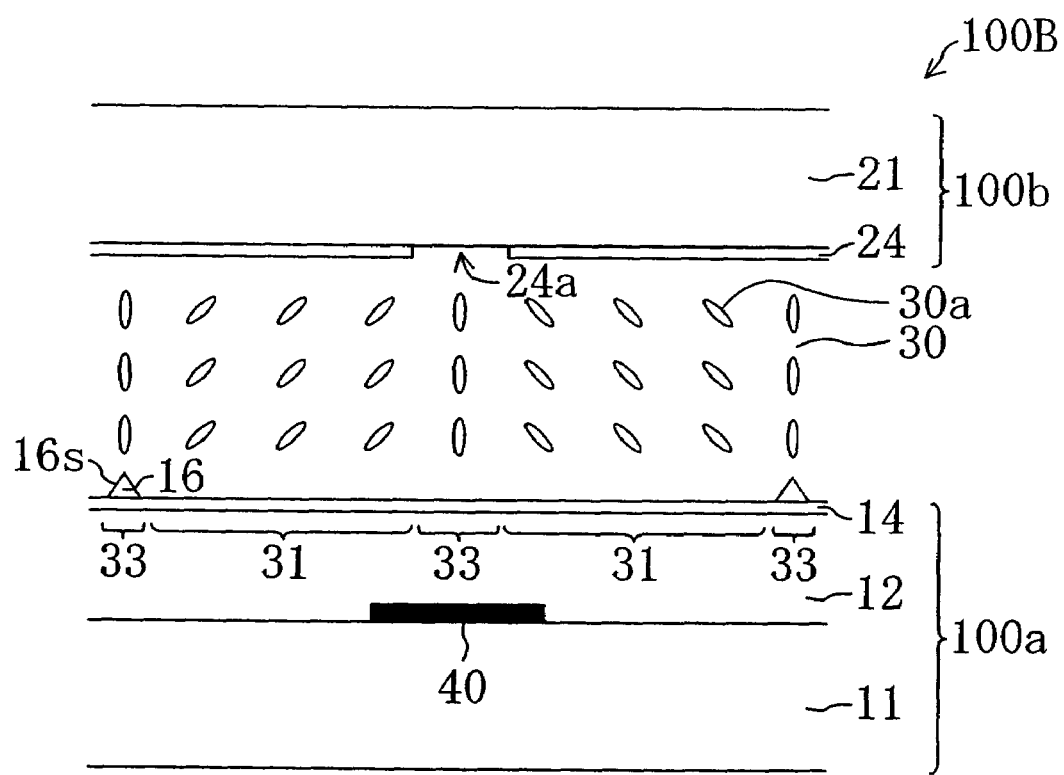

In this embodiment, the TFT substrate 100a includes the picture-element electrodes 14 having the openings (slits) 14a as the orientation-regulating structure, and the counter substrate 100b includes the protrusions 26 having the slant sides 26s as the orientation-regulating structure. The present invention is not limited to this, but may be suitably applied to other liquid crystal display devices having a structure permitting orientation division of the picture-element regions. For example, a liquid crystal display device 100B shown in FIGS. 8A and 8B may be adopted, in which the TFT substrate 100a has protrusions 16 having slant sides 16s and the counter substrate 100b has a counter electrode 24 having openings 24a. Only one substrate may have an orientation-regulating structure (for example, electrodes having openings and protrusions). However, from the standpoint of stability of alignment, both substrates preferably have respective orientation-regulating structures.

Embodiment 2

Figure 9A:
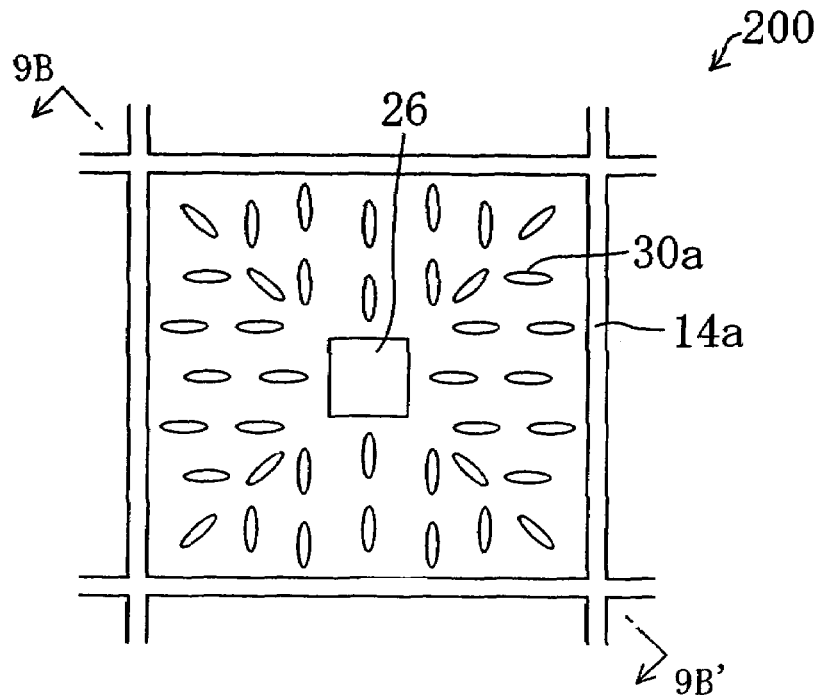
FIGS. 9A and 9B diagrammatically show a liquid crystal display device 200 of Embodiment 2 of the present invention, where
Figure 9B:
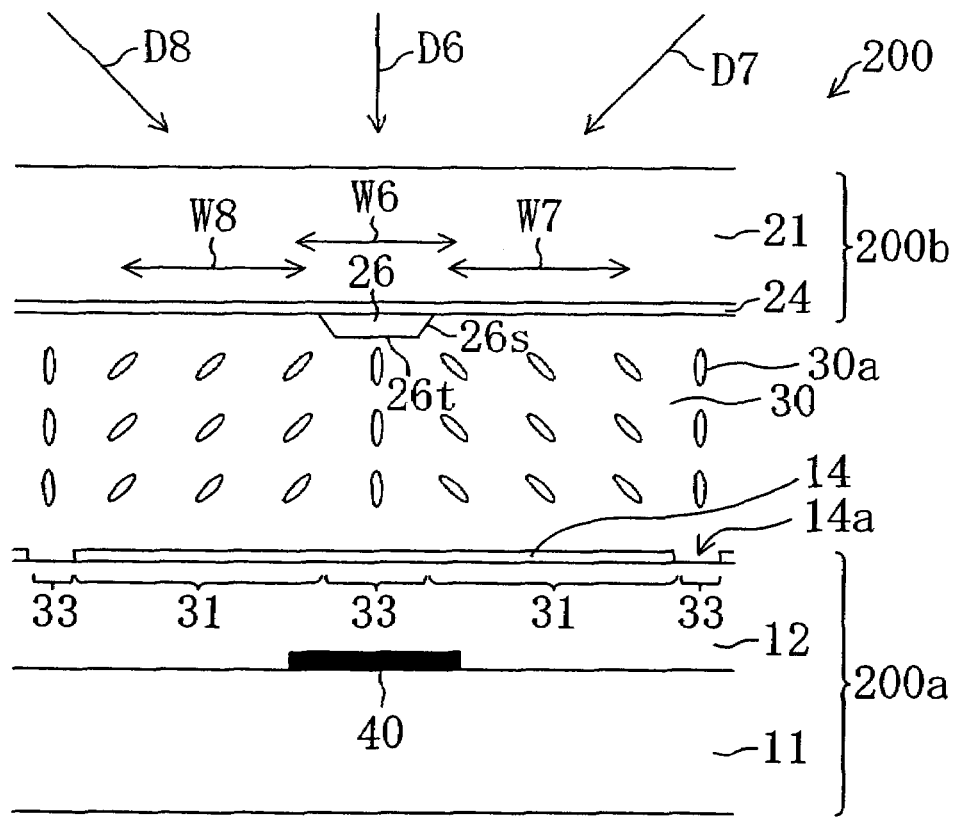

FIGS. 9A and 9B show a liquid crystal display device 200 of Embodiment 2 according to the present invention, where FIG. 9A is a top view of the liquid crystal display device 200 as viewed in the direction normal to the substrate, and FIG. 9B is a cross-sectional view taken along line 9B-9B' in FIG. 9A. FIGS. 9A and 9B show the state under application of a voltage across the liquid crystal layer.

In the liquid crystal display device 100 of Embodiment 1, each picture-element region was divided into four in terms of the orientation so that the liquid crystal molecules are oriented in four directions. In the liquid crystal display device 200 of Embodiment 2, each picture-element region is divided into an infinite number in terms of the orientation so that the liquid crystal molecules are oriented in all directions.

A TFT substrate 200a of the liquid crystal display device 200 includes picture-element electrodes 14 having openings 14a as an orientation-regulating structure. The openings 14a are slits formed in a square grid pattern.

A counter substrate 200b opposed to the TFT substrate 200a has protrusions 26 on the surface thereof facing the liquid crystal layer 30 as an orientation-regulating structure. Each protrusion 26 has a shape of a square truncated pyramid having slant sides 26s and a top face 26t, and is roughly in the center of each square surrounded by the grid-shaped openings 14a.

In this embodiment, the openings 14a of the picture-element electrode 14, having a line width of 10 μm, surround a square having a size of 40 μm×40 μm. The protrusion 26 has a bottom size of 20 μm×20 μm.

In the liquid crystal display device 200 having the orientation-regulating structures described above, when a voltage is applied between the picture-element electrode 14 and the counter electrode 24, liquid crystal molecules 30a in a liquid crystal layer 30 are oriented axially symmetrically with respect to the protrusion 26 as the center as shown in FIGS. 9A and 9B. Although the change in the orientation direction of the liquid crystal molecules 30a is shown simply in FIG. 9A, the orientation direction of the liquid crystal molecules 30a actually changes sequentially with change of the azimuthal direction. A liquid crystal molecule 30a existing at a position in a certain azimuthal direction with respect to the protrusion 26 is oriented in a direction substantially parallel to this azimuthal direction.

As described above, the liquid crystal layer 30, which is in the state of axially-symmetric orientation with respect to the protrusions 26 as the center, has a plurality of (a myriad of) liquid crystal regions 31 different in orientation direction, and thus the liquid crystal molecules 30a in each picture-element region are oriented in all directions. In other words, each picture-element region of the liquid crystal display device 200 is divided into an infinite number in terms of the orientation so that the liquid crystal molecules are oriented in all directions. In this embodiment, one liquid crystal domain, which is axially symmetrically oriented with respect to the protrusion 26 as the center, is formed in correspondence with one square surrounded with the grid-shaped openings 14a when a voltage is applied. The "liquid crystal domain" as used herein refers to a region in which the continuity of orientation of the liquid crystal molecules 30a is maintained.

The TFT substrate 200a of the liquid crystal display device 200 has light-shield layers 40. As shown in FIG. 9B, each light-shield layer 40 is formed to overlap (lie below) part of boundary region 33 defined as region separating the plurality of liquid crystal regions 31 from one another. More specifically, the light-shield layer 40 is formed near the center of the liquid crystal domain, to oppose to the protrusion 26 of the counter substrate 200b. In this embodiment, the light-shield layer 40 is formed to be the same in shape as viewed in the direction normal to the substrate as the protrusion 26 and overlap the protrusion 26, that is, formed in a shape of a square having a side of 20 μm.

As shown in FIG. 9B, the region of the boundary region 33 that overlaps (lies above) the light-shield layer 40 is a region permitting the liquid crystal molecules 30a surrounding the region to tilt so that the ends of the liquid crystal molecules 30a closer to the TFT substrate 100a, that is, the substrate having the light-shield layer 40 go away from this region when a voltage is applied between the picture-element electrode 14 and the counter electrode 24.

The light-shield layer 40 formed as described above selectively shades the liquid crystal region 31 in which the liquid crystal molecules 30a fall toward the opposite to the observer, that is, the liquid crystal region 31 of which the retardation value for light incident obliquely monotonously increases with rise of the voltage, among the liquid crystal regions 31 adjacent to each other via the boundary region 33.

In FIG. 9B, W6 denotes the width of a region shaded by the light-shield layer 40 during observation in the normal direction D6, and W7 denotes the width of a region shaded by the light-shield layer 40 during observation in an oblique direction D7. As shown in FIG. 9B, during observation in the normal direction, the light-shield layer 40 shades the region of the liquid crystal layer 30 located right above the light-shield layer 40. However, during observation in an oblique direction, the light-shield layer 40 selectively shades the liquid crystal region 31 in which the liquid crystal molecules 30a fall toward the opposite to the observer due to occurrence of parallax. FIG. 9B also shows the width W8 of a region shaded by the light-shield layer 40 during observation in an oblique direction D8 opposite to the oblique direction D7. As is found from FIG. 9B, during observation in the oblique direction D8, also, the light-shield layer 40 selectively shades the liquid crystal region 31 in which the liquid crystal molecules 30a fall toward the opposite to the observer.

As described above, the light-shield layer 40 selectively shades the liquid crystal region 31 in which the liquid crystal molecules 30a tilt toward the opposite to the observer in whichever oblique direction the observer observes the display device. Therefore, part of the liquid crystal region 31 in which the liquid crystal molecules 30a fall toward the opposite to the observer fails to contribute to the display during observation in an oblique direction. This suppresses the increase of the transmittance in the oblique direction during application of a gray-scale voltage, and thus brings the voltage-transmittance characteristic obtained during observation in the oblique direction close to the voltage-transmittance characteristic obtained during observation in the normal direction. As a result, the oblique-direction display characteristics and the normal-direction display characteristics can be made close to each other, and hence display free from unnaturalness can be realized.

Figure 10A:
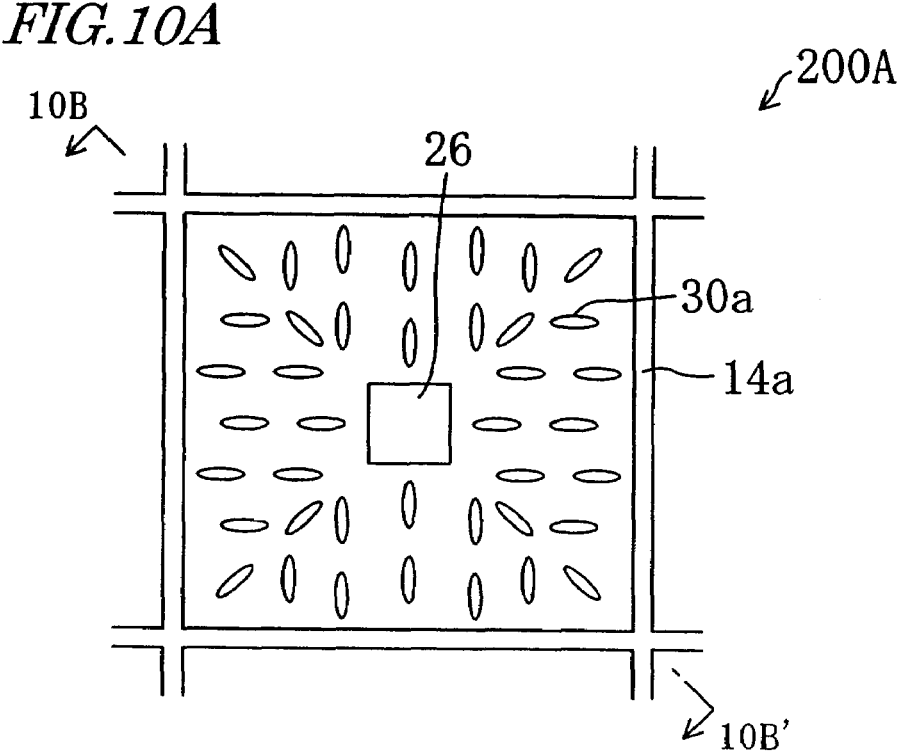
FIGS. 10A and 10B diagrammatically show another liquid crystal display device 200A of Embodiment 2 of the present invention, where
Figure 10B:
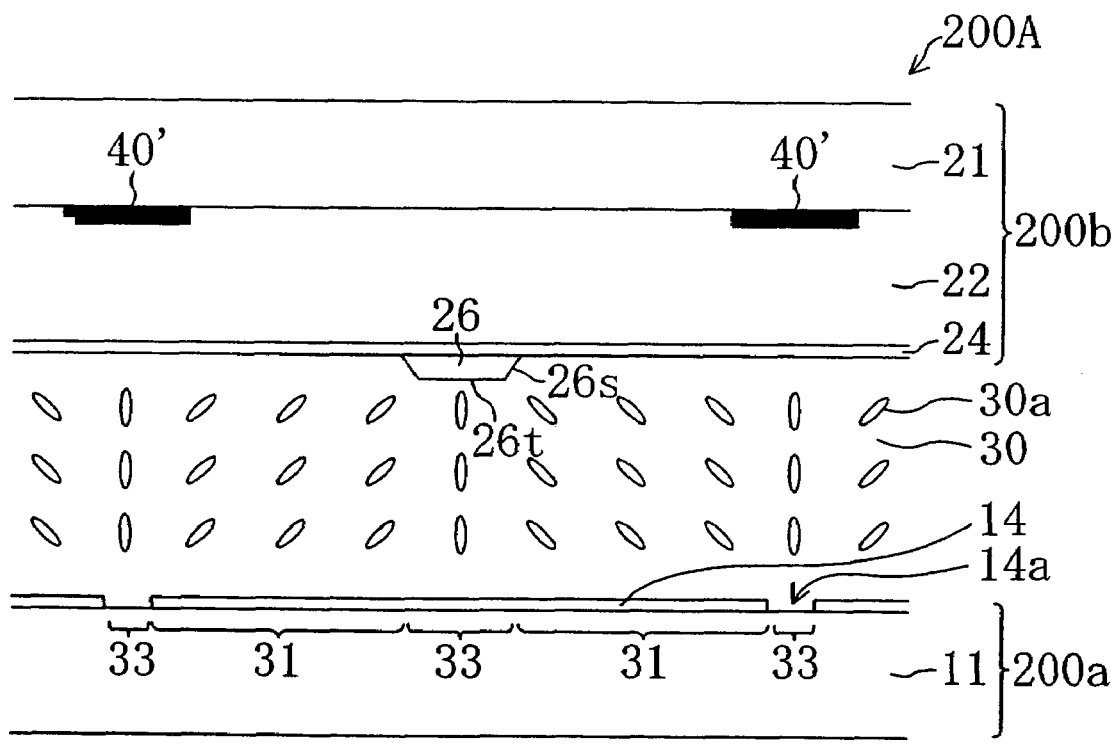

In this embodiment, the light-shield layer 40 was placed to overlap (lie below) the region among the boundary regions 33 that corresponds to the center of the liquid crystal domain. Alternatively, the light-shield layer 40 may be placed to oppose to the region corresponding to a boundary between the adjacent liquid crystal domains. FIGS. 10A and 10B show a liquid crystal display device 200A having light-shield layers 40' overlapping (lying above) the boundaries between the adjacent liquid crystal domains.

A counter substrate 200b of the liquid crystal display device 200A has the light-shield layers 40' formed to overlap (lie above) regions among the boundary regions 33 that correspond to the boundaries between the adjacent liquid crystal domains. That is, each light-shield layer 40' is formed to overlap (lie above) the opening 14a of the picture-element electrode 14. In other words, the region among the boundary regions 33 that overlaps (lies below) the light-shield layer 40' is a region permitting the liquid crystal molecules 30a surrounding the region to tilt so that the ends of the liquid crystal molecules 30a closer to the counter substrate 200b, that is, the substrate having the light-shield layer 40' go away from this region when a voltage is applied between the picture-element electrode 14 and the counter electrode 24.

The light-shield layer 40' of the counter substrate 200b selectively shades the liquid crystal region 31 in which the liquid crystal molecules 30a fall toward the opposite to the observer, that is, the liquid crystal region 31 of which the retardation value for light incident obliquely monotonously increases with rise of the voltage, among the liquid crystal regions 31 adjacent to each other via the boundary region 33, as in the case of the light-shield layer 40' of the counter substrate 100b of the liquid crystal display device 100A shown in FIGS. 7A and 7B. In this way, in the liquid crystal display device 200A, also, display free from unnaturalness can be realized.

Figure 11A:
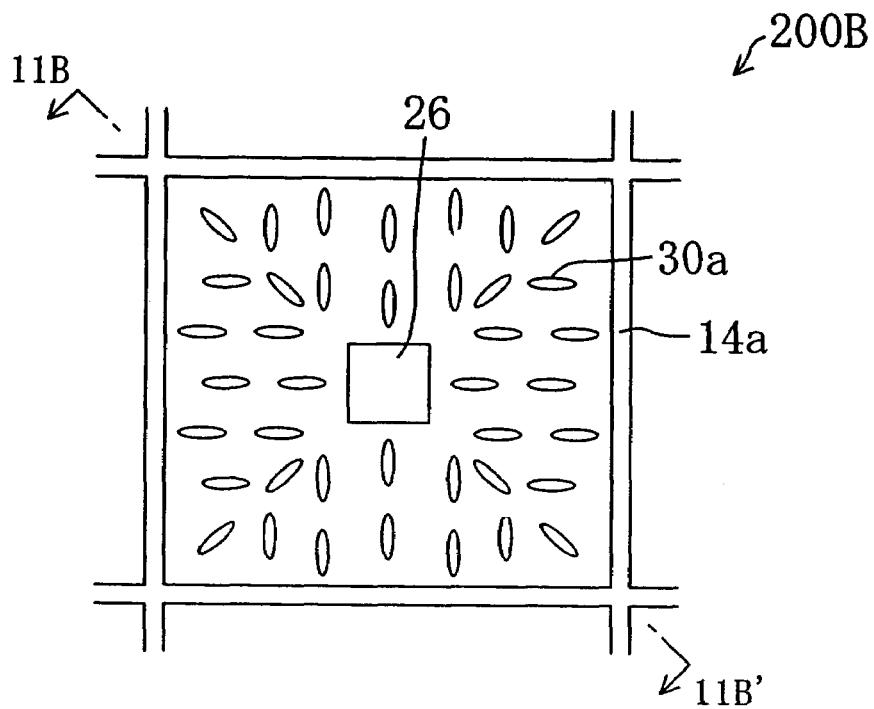
FIGS. 11A and 11B diagrammatically show yet another liquid crystal display device 200B of Embodiment 2 of the present invention, where
Figure 11B:
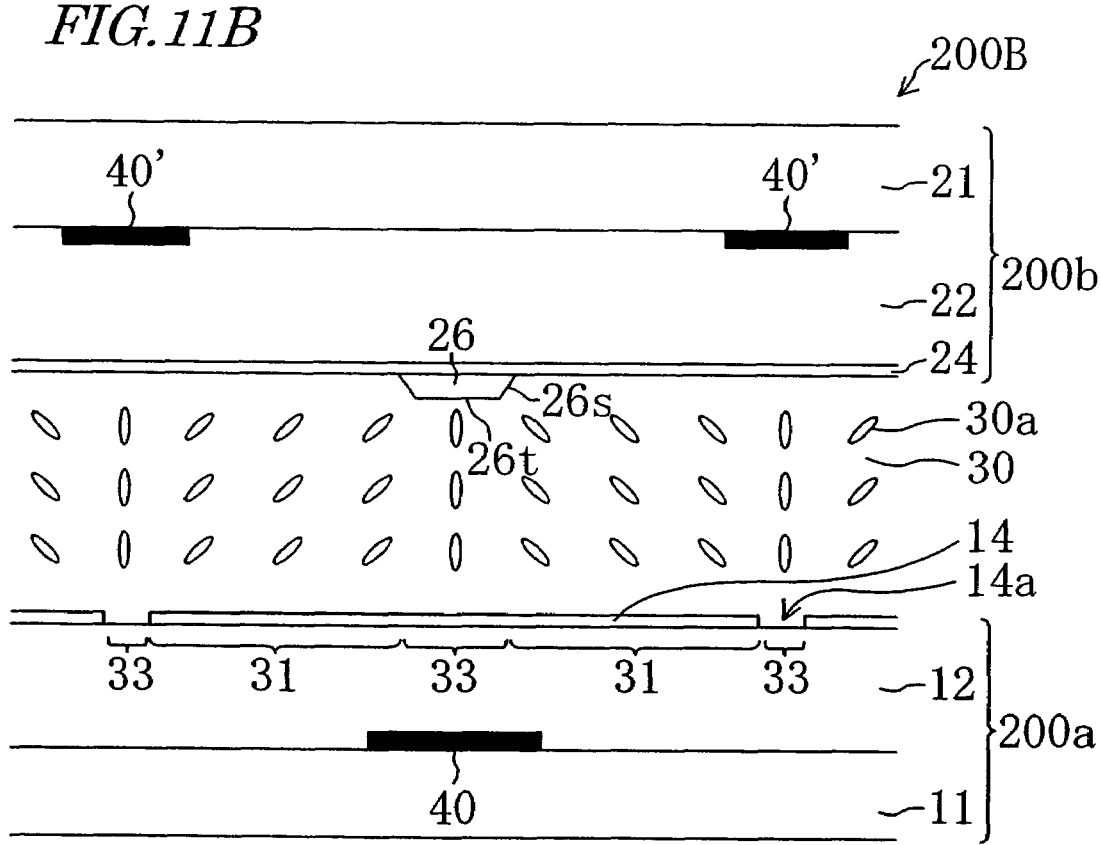

The light-shield layers may be provided to correspond to both the center of the liquid crystal domain and the boundaries between the liquid crystal domains. FIGS. 11A and 11B shows a liquid crystal display device 200B having the light-shield layers 40 and 40' provided for both the center of the liquid crystal domain and the boundaries between the liquid crystal domains.

In the liquid crystal display device 200B, the TFT substrate 200a has the light-shield layer 40 formed at the same position as that of the light-shield layer 40 of the TFT substrate 200a of the liquid crystal display device 200, and the counter substrate 200b has the light-shield layer 40' formed at the same position as that of the light-shield layer 40' of the counter substrate 200b of the liquid crystal display device 200A.

In the liquid crystal display device 200B, also, in which the light-shield layers 40 and 40' selectively shade the liquid crystal region 31 in which the liquid crystal molecules 30a fall toward the opposite to the observer, display free from unnaturalness is realized.

Embodiment 3

Figure 12A:
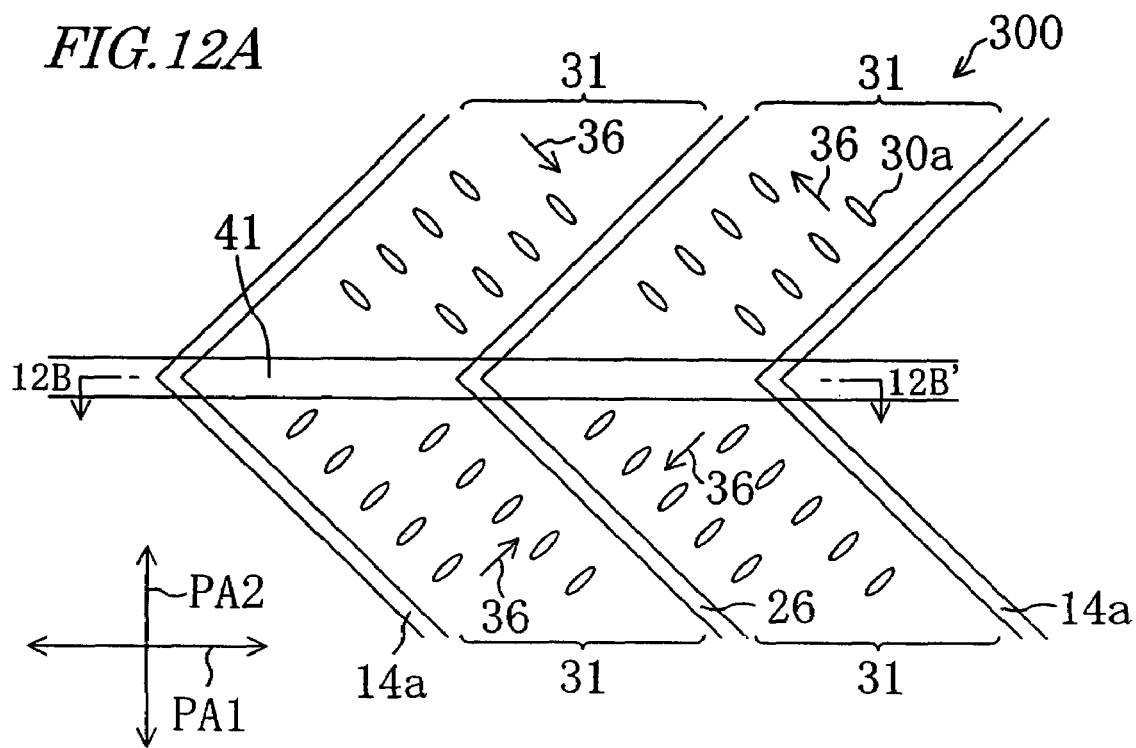
FIGS. 12A and 12B diagrammatically show a liquid crystal display device 300 of Embodiment 3 of the present invention, where
Figure 12B:
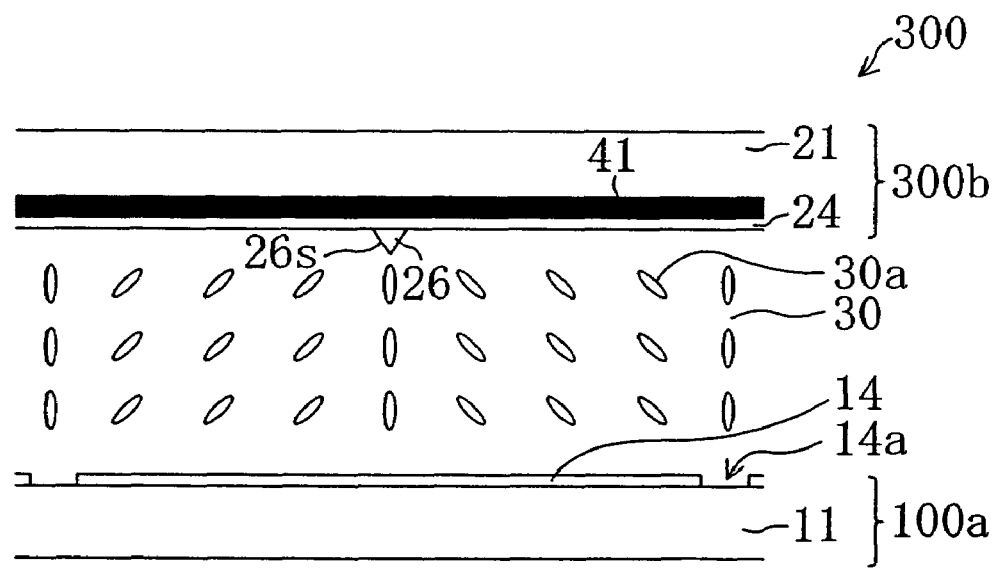

The structure of a liquid crystal display device 300 of Embodiment 3 according to the present invention will be described with reference to FIGS. 12A and 12B. FIG. 12A is a top view of the liquid crystal display device 300 as viewed in the direction normal to the substrate, and FIG. 12B is a cross-sectional view taken along line 12B-12B' in FIG. 12A. FIGS. 12A and 12B show the state under application of a voltage across the liquid crystal layer.

The liquid crystal display device 300 of Embodiment 3 is the same in construction as the liquid crystal display device 100 of Embodiment 1 except for the position of the light-shield layers.

A counter substrate 300b of the liquid crystal display device 300 has a light-shield layer 41 in each of a plurality of picture-element regions. The light-shield layer 41 is formed to overlap (lie above) a specific region of the liquid crystal layer 30 as will be described later.

Figure 13:
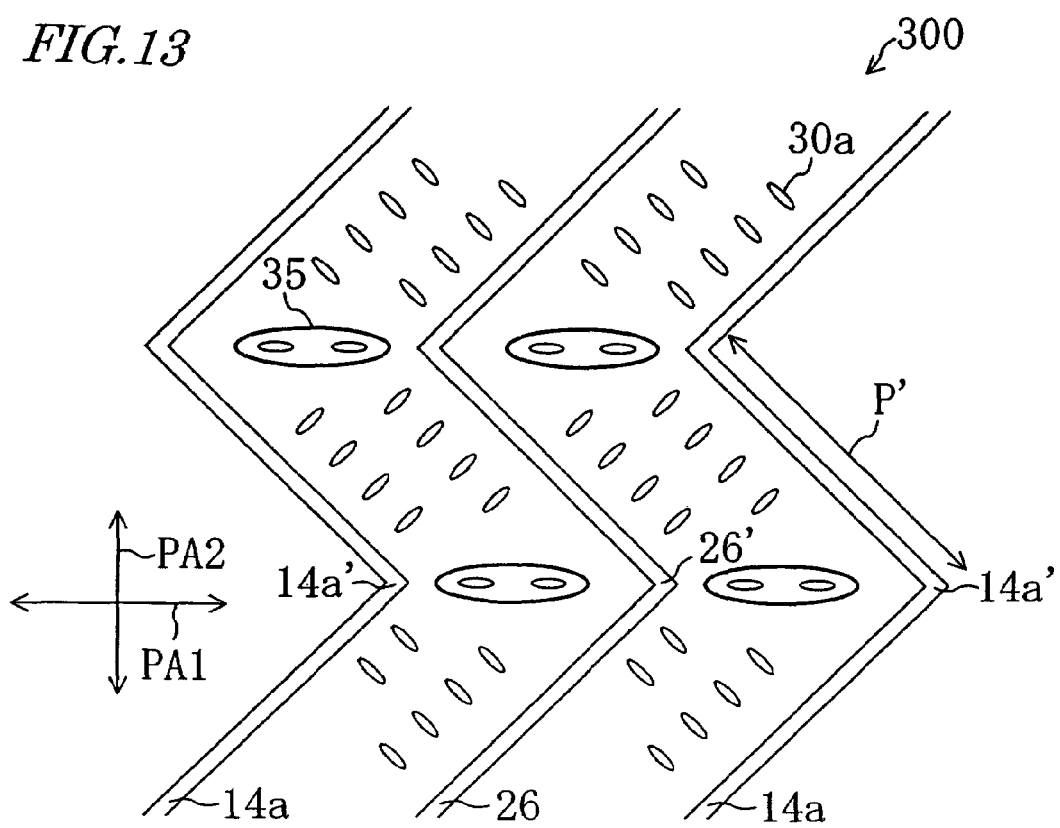
FIG. 13 is a diagrammatic top view of the liquid crystal display device 300 of Embodiment 3.

In the liquid crystal display device 300 in which each picture-element region is divided into four in terms of the orientation, the liquid crystal molecules 30a in each liquid crystal region 31 tilt at an angle of about 45° with respect to the polarization axes PA1 and PA2 of the polarizing plates as shown in FIG. 12A. However, as shown in FIG. 13, in a region (oval-encircled region) 35, among the regions separating the adjacent liquid crystal regions 31 from each other, which is located between a bend 14a' of the opening 14a and a bend 26' of the protrusion 26, the liquid crystal molecules 30a tilt in a direction substantially parallel to the polarization axis PA1 of the polarizing plate in an attempt of maintaining the continuity of the orientation.

In the liquid crystal display device 300, the light-shield layer 41 is formed to overlap (lie above) the region 35 in which the liquid crystal molecules 30a tilt in a direction substantially parallel to the polarization axis PA1 of the polarizing plate. In this embodiment, the light-shield layer 41 is formed right on the counter electrode 24. The counter electrode 24 of the counter substrate 300b has a thickness of 100 nm (1000 Å), for example, and the light-shield layer 41 is placed substantially right on the liquid crystal layer 30 via the counter electrode 24.

In Embodiments 1 and 2, described was the liquid crystal display device capable of suppressing unnaturalness that would otherwise be felt by the observer due to the liquid crystal molecules tilting toward the opposite to the observer. The liquid crystal display device 300 of Embodiment 3 can suppress unnaturalness that may otherwise be felt by the observer due to the liquid crystal molecules tilting in a direction substantially parallel to a polarization axis. This will be described in detail as follows.

The conventional liquid crystal display device 1000 having no light-shield layer shown in FIGS. 2A and 2B makes the observer feel unnatural due to the liquid crystal molecules 30a tilting in a direction substantially parallel to a polarization axis for the following reason.

When the liquid crystal display device 1000 is observed in an oblique direction along the polarization axis PA2, liquid crystal molecules 30a tilting along the polarization axis PA2 (assuming that such liquid crystal molecules 30a exist although actually they hardly exist in the liquid crystal display device 1000) hardly cause a phase difference for light incident obliquely to the liquid crystal layer 30, and thus do not affect the display characteristics. However, liquid crystal molecules 30a tilting along the polarization axis PA1 (corresponding to the liquid crystal molecules 30a in the regions 35 shown in FIG. 13), which tilt to block the observation direction, cause a phase difference for light incident obliquely to the liquid crystal layer 30. Moreover, such regions in which liquid crystal molecules 30a tilt in this direction exhibit a voltage-transmittance characteristic having the peak transmittance at a gray-scale voltage.

Figure 14:
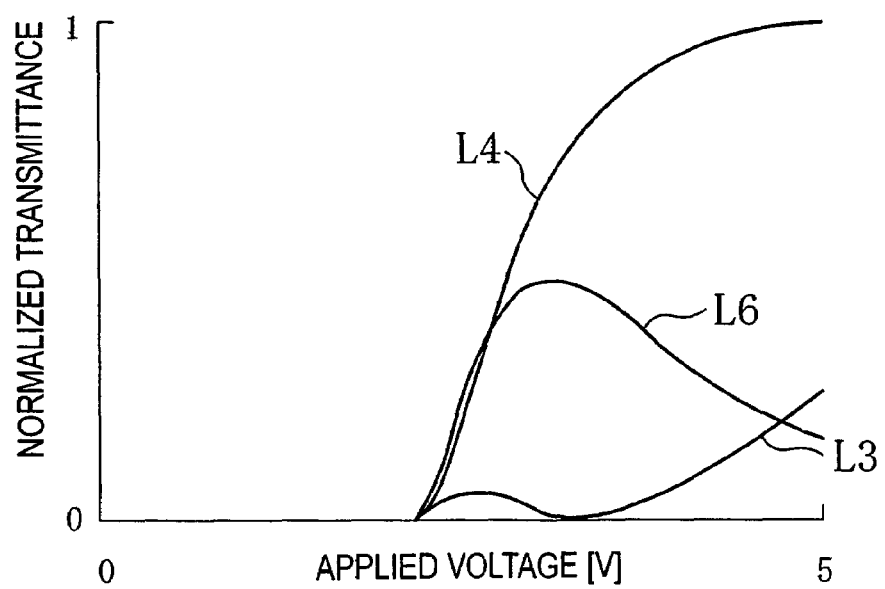
FIG. 14 is a graph showing the voltage-transmittance characteristic of a region in which liquid crystal molecules 30a tilt along a polarization axis PA1 obtained when the liquid crystal display device 1000 is observed in an oblique direction along a polarization axis PA2.

FIG. 14 shows a voltage-transmittance curve L6 of the region in which the liquid crystal molecules 30a tilt along the polarization axis PA1 obtained when the liquid crystal display device 1000 is observed in an oblique direction along the polarization axis PA2. For comparison, FIG. 14 also shows the voltage-transmittance curves L3 and L4 (shown in FIG. 4) of the region in which the liquid crystal molecules 30a tilt toward the observer at an angle of 45° with respect to the polarization axes PA1 and PA2 and the region in which the liquid crystal molecules 30a tilt in the direction opposite to the observer at an angle of 45° with respect to the polarization axes PA1 and PA2, respectively.

As is found from FIG. 14, in the region in which the liquid crystal molecules 30a tilt along the polarization axis PA1, the transmittance reaches the peak at a gray-scale voltage, causing inversion of the gradation of brightness. Therefore, if the proportion of existence of such liquid crystal molecules 30a in the picture-element region is high, breaking or inversion of the gradation becomes evident in the voltage-transmittance characteristic obtained during observation in an oblique direction. This increases the difference between the normal-direction display characteristics and the oblique-direction display characteristics, and the resultant display makes the observer feel unnatural.

In the liquid crystal display device 300 of this embodiment, the light-shield layer 41 is placed to overlap (lie above) the region 35 in which the liquid crystal molecules 30a tilt in a direction substantially parallel to the polarization axis PA1, to prevent this region 35 from contributing to the display. This suppresses excessive increase of the transmittance at a gray-scale voltage, and thus can bring the oblique-direction voltage-transmittance characteristic close to the normal-direction voltage-transmittance characteristic. As a result, since the oblique-direction display characteristics and the normal-direction display characteristics can be brought close to each other, display free from unnaturalness can be realized.

Figure 15:
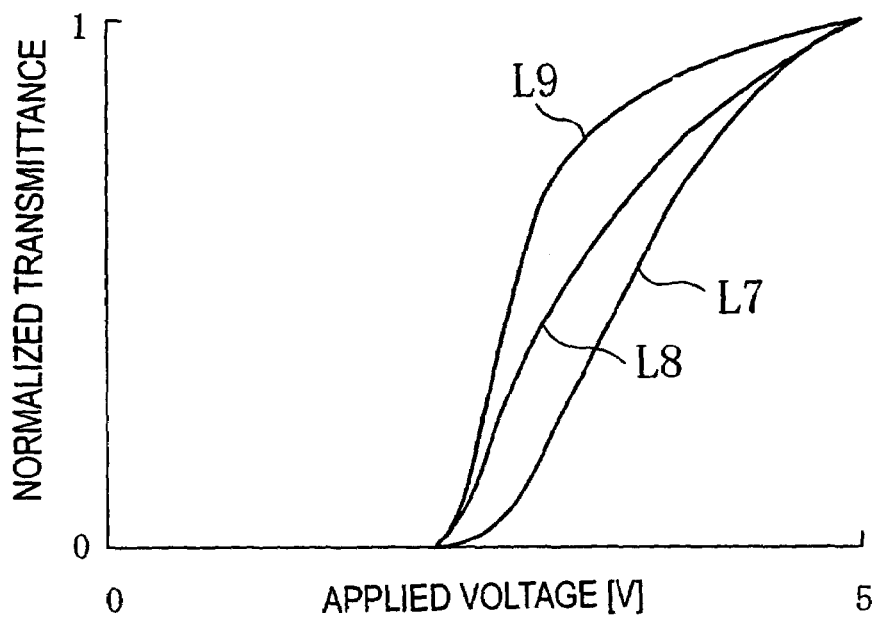
FIG. 15 is a graph showing the voltage-transmittance characteristics obtained when the liquid crystal display device 300 of Embodiment 3 is observed in the normal direction and in an oblique direction.

FIG. 15 shows a voltage-transmittance curve L7 obtained when the liquid crystal display device 300 of this embodiment is observed in the normal direction and a voltage-transmittance curve L8 obtained when it is observed in an oblique direction (direction at a visual angle falling along the polarization axis PA2). For comparison, FIG. 15 also shows a voltage-transmittance curve L9 obtained when the conventional liquid crystal display device 1000 is observed in the oblique direction. Note that the voltage-transmittance curves shown in FIG. 15 are those obtained when the regions 35 in which the liquid crystal molecules 30a tilt roughly in parallel with the polarization axis PA1 occupy about 25% of each picture-element region.

As shown in FIG. 15, the voltage-transmittance curve L8 obtained when the liquid crystal display device 300 is observed in an oblique direction is closer in shape to the voltage-transmittance curve L7 obtained when it is observed in the normal direction than the voltage-transmittance curve L9 of the display device having no light-shield layer is. Therefore, natural display in which the normal-direction display characteristics and the oblique-direction display characteristics are close to each other is obtained.

The region in which the liquid crystal molecules 30a tilt in a direction substantially parallel to the polarization axis does not contribute to the transmittance obtained during observation in the normal direction. Therefore, there is little loss in transmittance in the normal direction by providing the light-shield layer shading only such a region. To effectively shade only such a region, the light-shield layer should preferably be formed at a position that can prevent occurrence of parallax. In view of this, the light-shield layer is preferably formed substantially right on the liquid crystal layer so that the spacing of the light-shield layer from the liquid crystal layer is as small as possible. The effect of improving the display characteristics may be obtained when the light-shield layers are placed to cover only part of the regions in which the liquid crystal molecules 30a tilt in a direction substantially parallel to the polarization axis. However, from the standpoint of further improving the display quality, the light-shield layers are preferably placed to cover a largest possible portion of such regions, more preferably placed to cover substantially all of such regions.

The effect of improving the display quality, obtained by placing the light-shield layers to overlap (lie above or below) the regions in which the liquid crystal molecules tilt in a direction substantially parallel to the polarization axis, is significant in a liquid crystal display device having such regions in a comparatively high proportion.

For example, in the liquid crystal display device 1000 shown in FIGS. 2A and 2B, if the pitch of bends of each opening 14a and protrusion 26 (corresponding to P' in FIG. 13) is small, the proportion of the regions in which the liquid crystal molecules tilt in a direction substantially parallel to the polarization axis PA of the polarizing plate in each picture-element region is high. This will increase the difference between the normal-direction display characteristics and the oblique-direction display characteristics, and as a result, make unnaturalness of the display evident.

In view of the above, in a liquid crystal display device having such regions in a comparatively high proportion, a light-shield layer shading the regions in which the liquid crystal molecules 30a tilt in a direction substantially parallel to the polarization axis, like the light-shield layer 41 in the liquid crystal display device 300 of this embodiment, may be placed in addition to a light-shield layer selectively shading the liquid crystal regions in which the liquid crystal molecules tilt toward the opposite to the observer (the light-shield layers 40 and 40' in the liquid crystal display devices 100 and 200 of Embodiments 1 and 2). By this placement, the display quality can be further improved.

Light-shield layers shading the regions in which the liquid crystal molecules 30a tilt in a direction substantially parallel to the polarization axis (light-shield layers roughly the same as the light-shield layers 41 in the liquid crystal display device 300 of Embodiment 3) were additionally placed in the liquid crystal display device 100 of Embodiment 1, and the effect of improving the display quality by this additional placement was examined.

Figure 16:
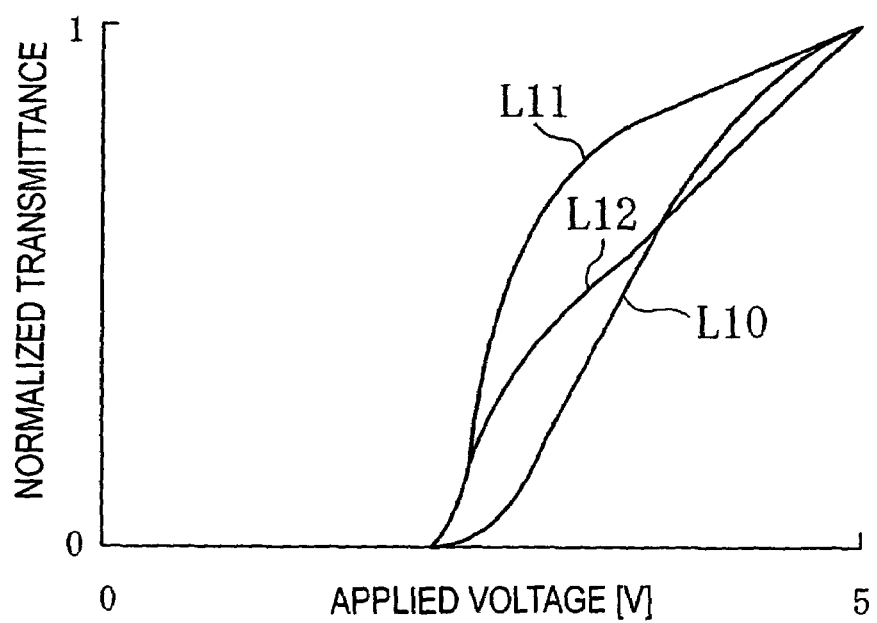
FIG. 16 is a graph showing the voltage-transmittance characteristics obtained when the liquid crystal display device 100 is observed in the normal direction and in an oblique direction, and the voltage-transmittance characteristic obtained when a liquid crystal display device having an additional light-shield layer is observed in an oblique direction.

FIG. 16 shows a voltage-transmittance curve L10 obtained when the liquid crystal display device 100 is observed in the normal direction, a voltage-transmittance curve L11 obtained when it is observed in an oblique direction (direction at a visual angle falling along the polarization axis PA2), and a voltage-transmittance curve L12 obtained when a liquid crystal display device having the additional light-shield layers described above is observed in an oblique direction. The voltage-transmittance curves shown in FIG. 16 are those obtained when the proportion of the regions in which the liquid crystal molecules 30a tilt in a direction substantially parallel to the polarization axis PA1 is about 25%.

As shown in FIG. 16, the voltage-transmittance curve L12 obtained by placing the additional light-shield layers is closer in shape to the normal-direction voltage-transmittance curve L10 than the voltage-transmittance curve L11 obtained without the additional light-shield layer is. Therefore, by placing the additional light-shield layers, the oblique-direction display characteristics become closer to the normal-direction display characteristics, and thus the display quality can further be improved.

Embodiment 4

Figure 17:
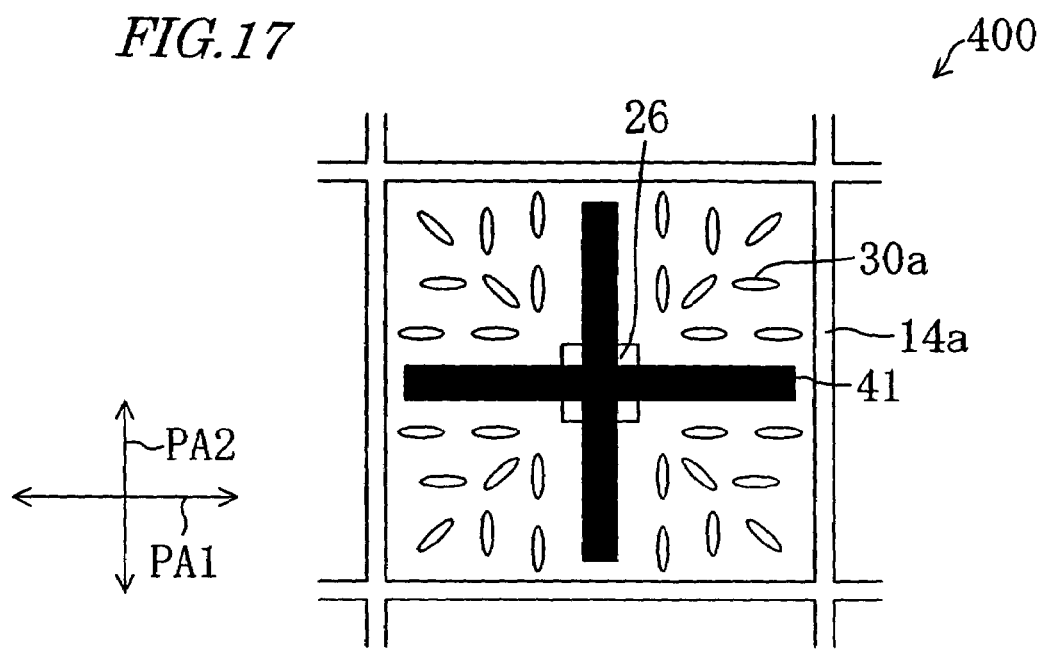
FIG. 17 is a diagrammatic top view of a liquid crystal display device 400 of Embodiment 4 of the present invention.

FIG. 17 shows a liquid crystal display device 400 of Embodiment 4 according to the present invention. The liquid crystal display device 400 shown in FIG. 17 has the same construction as the liquid crystal display device 200 of Embodiment 2 except for the position of the light-shield layers.

The counter substrate (not shown) of the liquid crystal display device 400 has a light-shield layer 41 in each of the plurality of picture-element regions. The light-shield layer 41 is formed to overlap (lie above) regions in which the liquid crystal molecules 30a tilt in directions substantially parallel to the polarization axes PA1 and PA2 of the polarizing plates. In the example shown in FIG. 17, the polarization axes PA1 and PA2 of the polarizing plates are arranged in parallel with the two directions in which the openings 14a of the picture-element electrodes 14 extend, and the light-shield layer 41 has a shape of a cross composed of two sides extending parallel to the polarization axes PA1 and PA2.

In the liquid crystal display device 400, the light-shield layer 41 is placed to overlap (lie above) regions in which the liquid crystal molecules 30a tilt in directions substantially parallel to the polarization axes PA1 and PA2 of the polarizing plates. Therefore, as in the liquid crystal display device 300 of Embodiment 3, natural display free from unnaturalness can be realized.

In the liquid crystal display device 300 of Embodiment 3, the light-shield layer 41 was placed to overlap (lie above) only the regions in which the liquid crystal molecules 30a tilt in a direction substantially parallel to the polarization axis PA1 considering the fact that there hardly exist liquid crystal molecules 30a tilting in a direction substantially parallel to the polarization axis PA2. In the liquid crystal display device 400 of this embodiment, there exist liquid crystal molecules 30a tilting along the polarization axis PA2 as well as those tilting along the polarization axis PA1. Therefore, the light-shield layer 41 is placed to cover the regions including such liquid crystal molecules 30a.

The light-shield layer 41 may be placed to overlap (lie above) only either the regions in which the liquid crystal molecules 30a tilt along the polarization axis PA1 or the regions in which the liquid crystal molecules 30a tilt along the polarization axis PA2. However, more natural display can be realized by placing the light-shield layer 41 to cover both regions.

Figure 18:
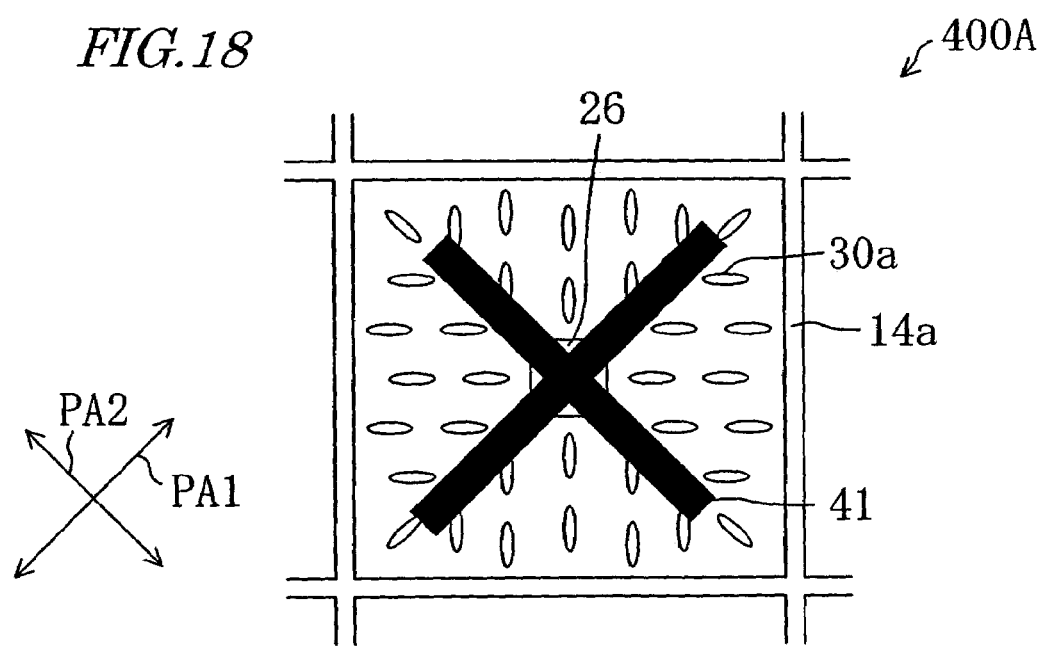
FIG. 18 is a diagrammatic top view of another liquid crystal display device 400A of Embodiment 4 of the present invention.

If the polarization axes of the polarizing plates are arranged differently for liquid crystal cells having roughly the same construction, the regions in which liquid crystal molecules tilt in directions substantially parallel to the polarization axes are different between these liquid crystal cells. Therefore, for different arrangements of the polarization axes, it should be ensured that the light-shield layer is placed so as to cover regions including such liquid crystal molecules. FIG. 18 shows a liquid crystal display device 400A in which the arrangement of the polarization axes PA1 and PA2 of the polarizing plates is different from that in the liquid crystal display device 400.

In the liquid crystal display device 400A shown in FIG. 18, the polarization axes PA1 and PA2 are arranged to form an angle of 45° with the two directions of extension of the openings 14a of the picture-element electrodes 14. Therefore, the light-shield layer 41 of the liquid crystal display device 400A has a shape obtained by rotating the light-shield layer 41 of the liquid crystal display device 400 by 45° in the plane parallel to the substrate plane.

In the liquid crystal display device 400A, also, the light-shield layer 41 is placed to cover regions in which the liquid crystal molecules 30a tilt in directions substantially parallel to the polarization axes PA1 and PA2 of the polarizing plates. Therefore, as in the liquid crystal display device 400, natural display free from unnaturalness can be realized.

Thus, according to the present invention, a liquid crystal display device with high display quality that has a wide viewing angle characteristic and can provide display free from unnaturalness is provided.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device comprising
a first substrate, a second substrate, and a vertical alignment type liquid crystal layer including liquid crystal molecules having negative dielectric anisotropy disposed between the first substrate and the second substrate, the liquid crystal display device being a vertical alignment type display wherein in an off state liquid crystal molecules of the liquid crystal layer are aligned substantially vertical and at least one vertical alignment film is provided for so aligning the liquid crystal molecules in the substantially vertical manner in the off state;
the device having a plurality of picture-element regions each defined by a first electrode placed in the first substrate on the side facing the liquid crystal layer and a second electrode placed in the second substrate to oppose to the first electrode via the liquid crystal layer,
in each of the plurality of picture-element regions, the liquid crystal layer having a plurality of liquid crystal regions different in the direction in which liquid crystal molecules tilt when a voltage is applied between the first electrode and the second electrode,
wherein at least one of the first substrate and the second substrate has a light-shield layer overlapping at least part of boundary region defined as regions separating the plurality of liquid crystal regions from each other,
the at least part of boundary region overlapping the light-shield layer is a region permitting liquid crystal molecules surrounding the region to tilt so that ends of the liquid crystal molecules closer to the substrate having the light-shield layer go away from the boundary region in the area where the boundary region overlaps the light-shielding layer when a voltage is applied between the first electrode and the second electrode;
wherein at least one of the first electrode and the second electrode has at least one opening defined therein;
a protrusion in the boundary region for causing the liquid crystal molecules to tilt, and wherein the protrusion and the light-shielding layer overlap one another but are on opposite substrates; and
wherein a depth D of the light-shielding layer satisfies a relationship $D+T_3/2=\sqrt{3} \times P/2$, where D is a depth of the light-shielding layer, $T_3$ is a thickness of the liquid crystal layer, and P is a pitch of an arrangement of at least some of the protrusions and openings.

2. The liquid crystal display device of claim 1, wherein the light-shield layer is placed with a predetermined spacing from the liquid crystal layer.

3. The liquid crystal display device of claim 1, wherein at least one of the first substrate and the second substrate has at least one protrusion having a slant side formed on the surface facing the liquid crystal layer, and the direction in which liquid crystal molecules tilt in each of the plurality of liquid crystal regions is defined by orientation-regulating force of the at least one protrusion.

4. The liquid crystal display device of claim 1, wherein the direction in which liquid crystal molecules tilt in each of the plurality of liquid crystal regions is defined by an inclined electric field generated at an edge portion of the at least one opening when a voltage is applied between the first electrode and the second electrode.

5. The liquid crystal display device of claim 1, wherein at least one of the first substrate and the second substrate has at least one protrusion having a slant side formed on the surface facing the liquid crystal layer, and
the direction in which liquid crystal molecules tilt in each of the plurality of liquid crystal regions is defined by orientation-regulating force of the at least one protrusion and an inclined electric field generated at an edge portion of the at least one opening when a voltage is applied between the first electrode and the second electrode.

6. The liquid crystal display device of claim 1, wherein the first substrate further includes switching elements respectively placed to correspond to the plurality of picture-element regions, and
the first electrode comprises a plurality of picture-element electrodes respectively placed for the plurality of picture-element regions and switched with the switching elements, and the second electrode comprises at least one counter electrode opposed to the plurality of picture-element electrodes.

7. The liquid crystal display device of claim 1, further comprising a pair of polarizing plates placed opposing to each other via the liquid crystal layer so that their polarization axes are substantially perpendicular to each other,
wherein in each of the plurality of picture-element regions, at least one of the first substrate and the second substrate has an additional light-shield layer overlapping at least part of regions in which liquid crystal molecules tilt in directions substantially parallel to the polarization axes of the pair of polarizing plates when a voltage is applied between the first electrode and the second electrode.

8. The display device of claim 1, wherein the boundary region is V-shaped.

9. A liquid crystal display device comprising a first substrate, a second substrate, and a vertical alignment type liquid crystal layer including liquid crystal molecules having negative dielectric anisotropy disposed between the first substrate and the second substrate,
the device having a plurality of picture-element regions each defined by a first electrode placed in the first substrate on the side facing the liquid crystal layer and a second electrode placed in the second substrate to oppose to the first electrode via the liquid crystal layer,
in each of the plurality of picture-element regions, the liquid crystal layer having a plurality of liquid crystal regions different in the direction in which liquid crystal molecules tilt when a voltage is applied between the first electrode and the second electrode, the plurality of liquid crystal regions of the liquid crystal layer including a first liquid crystal region of which the retardation value for light incident on the liquid crystal layer obliquely in a direction oblique from the normal to the liquid crystal layer increases with rise of an applied voltage and a second liquid crystal region of which the retardation value first decreases and then increases, at least one of the first and second liquid crystal regions being V-shaped, protrusions for causing the liquid crystal molecules to tilt, and wherein at least one of the first electrode and the second electrode has at least one opening defined therein;

wherein the device comprises a light-shield layer selectively shading the first liquid crystal region, but not the second liquid crystal region, when the device is observed in the direction oblique from the normal to the display plane; and wherein a depth D of the light-shield layer satisfies a relationship $D+T_3/2=\sqrt{3}\times P/2$, where D is a depth of the light-shield layer, $T_3$ is a thickness of the liquid crystal layer, and P is a pitch of an arrangement of the protrusions and openings.

10. The liquid crystal display device of claim 9, wherein at least one of the first substrate and the second substrate has at least one protrusion having a slant side formed on the surface facing the liquid crystal layer, and the direction in which liquid crystal molecules tilt in each of the plurality of liquid crystal regions is defined by orientation-regulating force of the at least one protrusion.

11. The liquid crystal display device of claim 9, wherein the direction in which liquid crystal molecules tilt in each of the plurality of liquid crystal regions is defined by an inclined electric field generated at an edge portion of the at least one opening when a voltage is applied between the first electrode and the second electrode.

12. The liquid crystal display device of claim 9, wherein at least one of the first substrate and the second substrate has at least one protrusion having a slant side formed on the surface facing the liquid crystal layer, at least one of the first electrode and the second electrode has at least one opening, and the direction in which liquid crystal molecules tilt in each of the plurality of liquid crystal regions is defined by orientation-regulating force of the at least one protrusion and an inclined electric field generated at an edge portion of the at least one opening when a voltage is applied between the first electrode and the second electrode.

13. The liquid crystal display device of claim 9, wherein the first substrate further includes switching elements respectively placed to correspond to the plurality of picture-element regions, and the first electrode comprises a plurality of picture-element electrodes respectively placed for the plurality of picture-element regions and switched with the switching elements, and the second electrode comprises at least one counter electrode opposed to the plurality of picture-element electrodes.

14. The liquid crystal display device of claim 9, further comprising a pair of polarizing plates placed opposing to each other via the liquid crystal layer so that their polarization axes are substantially perpendicular to each other, wherein in each of the plurality of picture-element regions, at least one of the first substrate and the second substrate has an additional light-shield layer overlapping at least part of regions in which liquid crystal molecules tilt in directions substantially parallel to the polarization axes of the pair of polarizing plates when a voltage is applied between the first electrode and the second electrode.

15. A liquid crystal display device comprising a first substrate, a second substrate, and a vertical alignment type liquid crystal layer including liquid crystal molecules having negative dielectric anisotropy disposed between the first substrate and the second substrate, the liquid crystal display device being a vertical alignment type display wherein in an off state liquid crystal molecules of the liquid crystal layer are aligned substantially vertical and at least one vertical alignment film is provided for so aligning the liquid crystal molecules in the substantially vertical manner in the off state;

protrusions for causing the liquid crystal molecules to tilt;

the device having a plurality of picture-element regions each defined by a first electrode placed in the first substrate on the side facing the liquid crystal layer and a second electrode placed in the second substrate to oppose to the first electrode via the liquid crystal layer, wherein at least one of the first electrode and the second electrode has at least one opening defined therein;

in each of the plurality of picture-element regions, the liquid crystal layer having a plurality of liquid crystal regions different in the direction in which liquid crystal molecules tilt when a voltage is applied between the first electrode and the second electrode, a plurality of V-shaped boundary regions in a picture-element region, the V-shaped boundary regions separating the plurality of liquid crystal regions from each other, and wherein at least one of the first substrate and the second substrate has at least one light-shield layer overlapping a plurality of said V-shaped boundary regions, and where each V-shaped boundary region overlapping the light-shield layer(s) is a region permitting liquid crystal molecules surrounding the region to tilt so that ends of the liquid crystal molecules closer to the substrate having the light-shield layer go away from the boundary region in the area where the boundary region overlaps the light-shielding layer when a voltage is applied between the first electrode and the second electrode; and wherein a depth D of the light-shield layer satisfies a relationship $D+T_3/2=\sqrt{3}\times P/2$, where D is a depth of the light-shield layer, $T^3$ is a thickness of the liquid crystal layer, and P is a pitch of an arrangement of the protrusions and openings.

16. A liquid crystal display device comprising a first substrate, a second substrate, and a vertical alignment type liquid crystal layer including liquid crystal molecules having negative dielectric anisotropy disposed between the first substrate and the second substrate, the liquid crystal display device being a vertical alignment type display wherein in an off state liquid crystal molecules of the liquid crystal layer are aligned substantially vertical and at least one vertical alignment film is provided for so aligning the liquid crystal molecules in the substantially vertical manner in the off state;

the device having a plurality of picture-element regions each defined by a first electrode placed in the first substrate on the side facing the liquid crystal layer and a second electrode placed in the second substrate to oppose to the first electrode via the liquid crystal layer, wherein at least one of the first electrode and the second electrode has at least one opening defined therein;

protrusions for causing the liquid crystal molecules to tilt;

in each of the plurality of picture-element regions, the liquid crystal layer having a plurality of liquid crystal regions different in the direction in which liquid crystal molecules tilt when a voltage is applied between the first electrode and the second electrode, a plurality of substantially parallel boundary regions in a picture-element region, the boundary regions separating the plurality of liquid crystal regions from each other, and wherein at least one of the first substrate and the second substrate has at least one light-shield layer overlapping each of a plurality of said substantially parallel boundary regions, and where each boundary region overlapping the light-shield layer(s) is a region permitting liquid crystal molecules surrounding the region to tilt so that ends of the liquid crystal molecules closer to the substrate having the light-shield layer go away from the boundary region in the area where the boundary region overlaps the light-shielding layer when a voltage is applied between the first electrode and the second electrode; and wherein a depth D of the light-shield layer satisfies a relationship $D+T_3/2=\sqrt{3}\times P/2$, where D is a depth of the light-shield layer, $T_3$ is a thickness of the liquid crystal layer, and P is a pitch of an arrangement of the protrusions and openings.

17. The display device of claim 16, wherein the substantially parallel boundary regions in a picture element region are V-shaped.

* * * * *